US007288871B1

(12) United States Patent
Lu et al.

(10) Patent No.: US 7,288,871 B1
(45) Date of Patent: Oct. 30, 2007

(54) SOLID-IN-HOLLOW POLYMER FIBER ELECTROCHEMICAL DEVICES

(75) Inventors: Wen Lu, Santa Fe, NM (US); Elisabeth Smela, Silver Spring, MD (US); Phillip N. Adams, Albuquerque, NM (US); Guido Zuccarello, Silver Spring, MD (US); Benjamin R. Mattes, Santa Fe, NM (US)

(73) Assignee: Santa Fe Science and Technology, Inc., Santa Fe, NM (US)

( * ) Notice: Subject to any disclaimer, the term of this patent is extended or adjusted under 35 U.S.C. 154(b) by 295 days.

(21) Appl. No.: 10/886,001

(22) Filed: Jul. 6, 2004

Related U.S. Application Data

(60) Provisional application No. 60/485,530, filed on Jul. 3, 2003.

(51) Int. Cl.
*H02N 11/00* (2006.01)
*B32B 23/00* (2006.01)

(52) U.S. Cl. .................. 310/300; 428/393; 428/373; 428/375

(58) Field of Classification Search ............... 310/300; 428/393

See application file for complete search history.

(56) References Cited

U.S. PATENT DOCUMENTS

| 4,743,189 A * | 5/1988 | Samuelson ............... 425/131.5 |
|---|---|---|
| 4,861,661 A * | 8/1989 | Samuelson .................. 428/398 |
| 5,556,700 A | 9/1996 | Kaneto et al. |
| 5,932,309 A * | 8/1999 | Smith et al. .................. 428/46 |
| 6,074,742 A * | 6/2000 | Smith et al. ................ 428/329 |
| 6,730,399 B2 * | 5/2004 | Smith et al. ................ 428/373 |
| 2003/0054158 A1 * | 3/2003 | Smith et al. ................ 428/323 |
| 2004/0119187 A1 * | 6/2004 | Mattes et al. ............... 264/103 |

FOREIGN PATENT DOCUMENTS

| JP | 357025416 A | * | 2/1982 |
|---|---|---|---|
| WO | WO 99/24991 | | 5/1999 |

OTHER PUBLICATIONS

J.M. Machado et al. "Anisotropic mechanical properties of uniaxially oriented electrically conducting poly(p-phenylene vinylene)". Polymer, 1989, vol. 30 pp. 1992-1996.

(Continued)

*Primary Examiner*—Jill Gray
(74) *Attorney, Agent, or Firm*—Samuel M. Freund; Cochran Freund & Young LLC

(57) ABSTRACT

A linear electrochemical actuator is described where at least one electrically conductive (between 400 and 1000 S/cm), doped polyaniline solid fiber or a yarn produced from such fibers is disposed in an electrolyte inside of a electrically conductive polyaniline hollow fiber, thereby allowing 2-electrode operation without a metal backing. This is an example of the electrochemical devices of the present invention having a solid-in-hollow polymer fiber configuration. In a propylene carbonate electrolyte, the electrochemical and actuation behavior of the fibers was found to be influenced by the solubility and size of the polymer dopants. That is, solubility of the dopant in the electrolyte resulted in high electroactivity and strain in the fibers. Actuation of fibers was also affected by electrolyte anions, small anions resulting in anion-exchange dominated actuation, while large anions resulted in cation-exchange dominated actuation. Isotonic strains of 0.9% and isometric stresses of 0.9 MPa were realized for the solid-in-hollow polyaniline fiber actuators.

16 Claims, 26 Drawing Sheets

OTHER PUBLICATIONS

G. Horanyi et al. "Anion-Involvement in Electrochemical Transformations of Polyaniline. A Radiotracer Study". Electrochimica Acta. vol. 30, No. 7 pp. 947-952. 1988.

E.M.Genies et al. "Electrochemical Behavior, Chronocoulometric and Kinetic Study of the Redox Mechanism of Polyaniline Deposits". J. Electroanal. Chem. V 200. pp. 127-145. 1986.

A. Mazzoldi et al. "Actuative Properties of Polyaniline Fibers Under Electrochemical Stimulation". Mat. Sci. Eng. vol. C6 pp. 65-72 1998.

L.Bay et al. "Potential Profile in a Conducting Polymer Strip". Proc. SPIE. vol. 4329. pp. 54-58. 2001.

T. Kobayashi et al. "Polyaniline Film-Coated Electrodes as Electrochromic Display Devices". J. Electroanalyt. Chem. vol. 161. pp. 419-423. 1984.

J.M. Sansinena et al. "A Solid State Artificial Muscle bbased on Polypyrrole and a Solid Polymeric Electrolyte Working in Air". Chem. Commun. pp. 2217-2218 1997.

T.W. Lewis et al. "Development of an All-Polymer, Axial Force Electrochemical Actuator". Synthetic Metals vol. 102. pp. 1317-1318. 1999.

W. Huang et al. "Polyaniline, a Novel Conducting Polymer". J. Chem. Soc. Faraday Trans. vol. 82 pp. 2385-2400. 1986.

W. Lu et al. "Electrochemical Actuation of Gilded Polyaniline Bilayers in Aqueous Acid Solutions". Proc. SPIE. vol. 4329 pp. 505-515. 2001.

M. Kaneko et al. "Electrolyet and Strain Dependences of Chemomechanical Deformation of Polyaniline Film". Synthetic Metals vol. 84, pp. 795-796. 1997.

Q. Pei et al. "Electrochemical Applications of the Bending Beam Method. 1. Mass Transport and Volume Changes in Polypyrrole dur". J. Phys. Chem. vol. 96, pp. 10507-10514. 1992.

K. Naoi et al. "Quartz Crystal Microbalance Study: Ionic Motion Across Conducting Polymers". J. Electrochem. Soc. vol. 138, pp. 440-445. 1991.

W. Lu et al. "Development of Solid-in-Hollow Electrochemical Linear Actuators Using Highly Conductive Polyaniline". Chem. Mater. vol. 16, pp. 1615-1621. 2004.

* cited by examiner

SOLID-IN-HOLLOW POLYMER FIBER ELECTROCHEMICAL DEVICES

CROSS REFERENCE TO RELATED APPLICATIONS

This application is based upon and claims the benefit of U.S. Provisional Patent Application 60/485,530 entitled "Solid-In-Hollow Polyaniline Fiber Electrochemical Devices" filed Jul. 3, 2003, the entire contents of which are hereby incorporated by reference herein for all it discloses and teaches.

STATEMENT REGARDING FEDERAL RIGHTS

The present invention was made in part with government support from the Defense Advanced Research Projects Agency Defense Science Office under Contract Number MDA972-99-C-0044. The government has certain rights in the invention.

FIELD OF THE INVENTION

The present invention relates generally to conducting polymer electrochemical devices and, more particularly, to electrochemical devices comprising at least one solid conducting polymer fiber or a yarn composed of conducting polymer fibers, disposed within a hollow conducting polymer fiber filled with a gel, polymer or ionic liquid electrolyte.

BACKGROUND OF THE INVENTION

Conducting polymers including polyanilines, polypyrroles, and polythiophenes, have attracted attention as electrochemical actuators (See, e.g., K. Kaneto et al., U.S. Pat. No. 5,556,700; A. Mazzoldi et al., Mat. Sci. Eng. C6, 65 (1998).), since they are light-weight, low-cost, low-operating-voltage materials having the capability of generating high stress. Actuation is achieved by utilizing an electrochemical reaction to produce mechanical motion. Volume change of a conducting polymer during its redox process is thought to be achieved by electrolyte ion transport into and out of the polymer, solvent transport into and out of the polymer, polymer chain configuration changes, and electrostatic repulsion between polymer chains. Such actuators are expected to find applications in robots, artificial limbs, and other bio-mimetic devices, as examples.

The conductivity of the polymer plays an important role in determining polymer electroactivity and actuation. If the polymer is resistive, then the applied potential decreases with distance from the electrical contact. Applying a higher potential at the electrode to achieve a desired oxidation level further from the electrode may damage the material closer to the electrode. Moreover, oxygen reduction reactions further limit the electrochemical potentials in a resistive film (See, e.g., L. Bay et al., Proc. SPIE 4329, 54 (2001).). Thus, if the material is not highly conductive, a metal contact is required along the length of the polymer. The conductivity of conducting polymers used in electrochemical devices is typically less than 100 S/cm, with 300 S/cm being the highest conductivity reported for an actuator (See, e.g., M. Satoh et al., Synth. Met. 14, 289 (1986).), so a metal layer is required. Metal layers may corrode, react in the electrolyte, delaminate, or crack. In addition, use of a metal layer adds processing steps and expense to the production of actuators.

Aqueous electrolytes have a narrow electrochemical window, and some conducting polymers degrade in aqueous media (See, e.g., T. Kobayashi et al., Electroanalyt. Chem. 161, 419 (1984); and E. M. Genies and C. J. Tsintavis, J. Electroanalyt. Chem. 200, 127 (1986).). Moreover, aqueous electrolytes evaporate from unsealed containers thereof, rendering an electrochemical device involving their use inoperative. The use of non-aqueous electrolytes having wide electrochemical windows, high boiling points, and high ionic conductivity is advantageous.

Current quasi-solid actuators have a polymer or a gel containing a liquid electrolyte sandwiched between two conducting-polymer electrodes (See, e.g., Y. Min et al., Polym. Mat. Sci. Eng. 71, 713 (1994); and J. M. Sansinena et al., Chem. Commun. 2217 (1997)), where one electrode is the working electrode, and the other is the counter electrode; no reference electrode is needed. Such actuators generally function by bending, but actuators capable of linear motion have been reported (See, e.g., T. Lewis et al., Synth. Met 102, 1317 (1999); and U.S. Pat. No. 6,982,514 for "Electrochemical Devices Incorporating High-Conductivity Conjugated Polymers" which issued to W. Lu et al. on Jan. 3, 2006.).

Accordingly, it is an object of the present invention to provide a compact, two-electrode electrochemical device.

Another object of the invention is to provide electrochemical devices useful for actuation and energy storage.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects of the present invention, and in accordance with its purposes, as embodied and broadly described herein, the apparatus for achieving linear actuation hereof includes a hollow conductive polymer fiber; at least one conductive polymer solid fiber having a chosen electrical conductivity and disposed within the hollow conductive polymer fiber such that the at least one conductive polymer solid fiber is electrically isolated from the conductive polymer hollow fiber, and wherein the chosen electrical conductivity of the at least one conductive polymer solid fiber is such that linear activation occurs; an electrolyte disposed within the hollow conductive polymer fiber; and a voltage source for providing a potential difference between the at least one conductive polymer solid fiber and the hollow conductive polymer fiber.

Benefits of the present invention include electrochemical devices having simple, two-polymer-electrode construction where the hollow fiber is used as a quasi-reference electrode during operation, and where a metallic backing of the solid is unnecessary to achieve linear actuation.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2a shows the cyclic voltammogram (dashed line) and length change (solid line) for a PANI.AMPSA film in 1 M HCl, while

FIG. 3a shows the cyclic voltammogram (dashed line) and length change (solid line) for a PANI.AMPSA film in 1 M $LiClO_4$/PC, while

FIG. 4a shows the cyclic voltammogram (dashed line) and length change (solid line) for a PANI.$CF_3SO_3$ film in 1 M $LiClO_4$/PC, while

FIGS. 9a and 9b show the actuation profiles of the solid-in-hollow fiber linear actuator described in FIG. 8 hereof for voltage cycling, where the scan rate for the cyclic voltammetry (dashed line) is 1 mV/s, while

DETAILED DESCRIPTION

Figure 1:
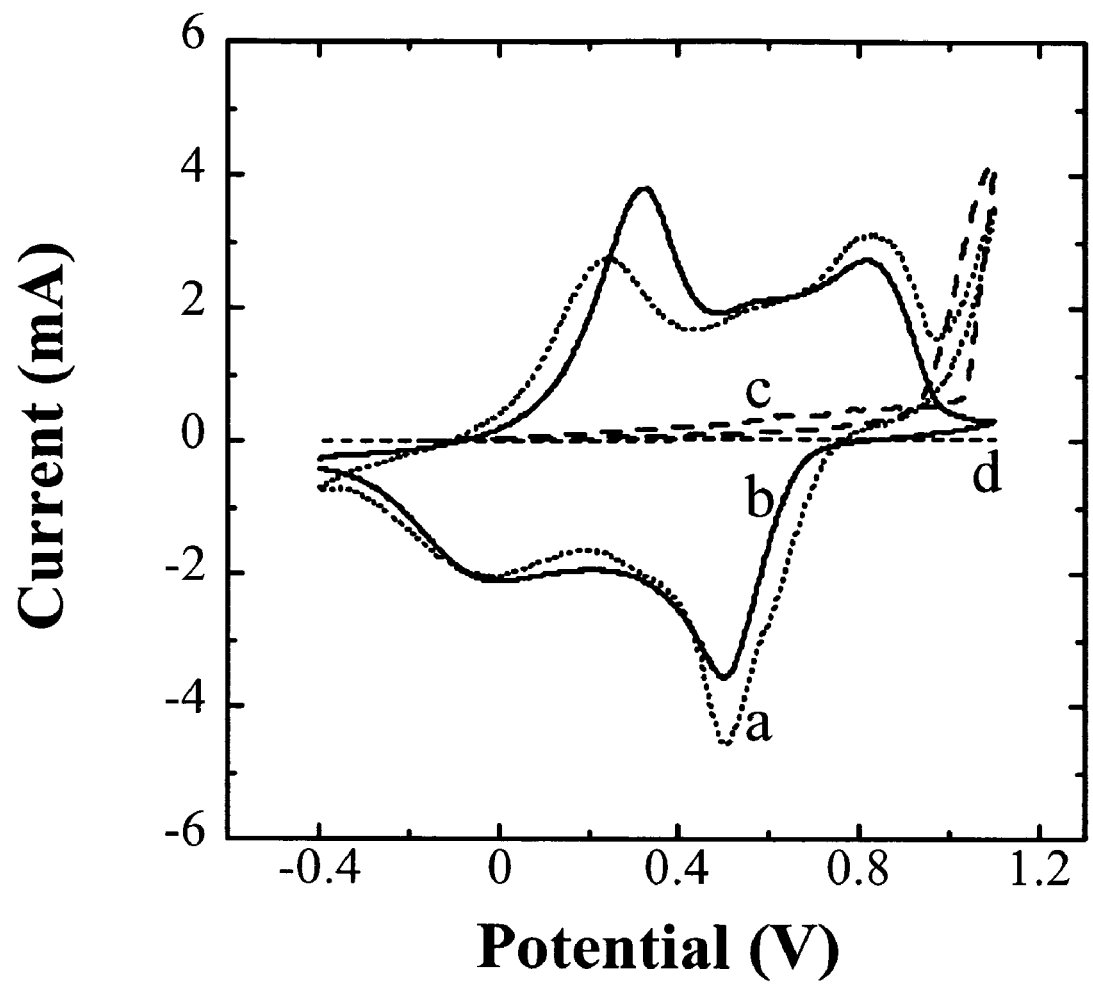
FIG. 1 shows a cyclic voltammogram in 1 M HCl for a gilded PANI.AMPSA film (curve a); a cyclic voltammogram in 1 M HCl for an ungilded PANI.AMPSA film (curve b); a cyclic voltammogram in 1 M HCl for gold film (curve c); and a cyclic voltammogram in 1 M HCl for an ungilded, low-conductivity PANI film (curve d), all taken at a scan rate of 50 mV/s.

Briefly, the present invention includes the use of at least one solid conducting polymer fiber disposed inside of a hollow conducting polymer fiber containing an electrolyte for fabricating two-electrode electrochemical devices. A linear displacement actuator is demonstrated as an example. Gel electrolytes, ionic liquids and polymeric electrolytes can be used in place of aqueous electrolytes, allowing such devices to be operated in air. Other electrochemical devices employing the solid-in-hollow conductive polymer design of the present invention include energy storage devices such as capacitors and batteries.

The high electrical conductivity of polyaniline fibers doped with 2-acrylamido-2-methyl-1-propanesulfonic acid (PANI.AMPSA) permits a uniform potential distribution to be established along the length of the material. This allows their use without a metal backing with well-defined electroactivity and electrochemical actuation being exhibited. While as-synthesized PANI.AMPSA fibers can be used directly in aqueous electrolytes, these fibers were dopant-exchanged with soluble anions prior for use in propylene carbonate electrolyte.

Electrochemical actuation of the polyaniline fiber was affected by the composition of the electrolyte. Anion or cation exchange was achieved by using electrolytes with small or large anions, respectively. Mixed exchange was observed for medium-sized anions.

Reference will now be made in detail to the present preferred embodiments of the invention examples of which are illustrated in the accompanying drawings.

All reagents were analytic grade. Aqueous acid solutions were prepared with deionized water. Propylene carbonate (PC), was dried over molecular sieve (3 Å, beads, 8-12 mesh) prior to use. Ethylene carbonate (EC), and poly (methyl methacrylate) (PMMA, $M_w$=990,000 g/mol), were used without further purification.

A. Synthesis of High Molecular-Weight Polyaniline:

Water (6,470 g) was added to a 50 L jacketed reaction vessel fitted with a mechanical stirrer. Phosphoric acid (15,530 g) was then added to the water, with stirring, to give a 60 mass % phosphoric acid solution. Aniline (1,071 g, 11.5 moles) was added to the reaction vessel over a 1 h period by means of a dropping funnel in the top of the reaction vessel. The stirred aniline phosphate was then cooled to −35.0° C. by passing a cooled 50/50 by mass, methanol/water mixture through the vessel jacket. The oxidant, ammonium persulfate (3,280 g, 14.37 moles) was dissolved in water (5,920 g), and the resulting solution was added to the cooled, stirred reaction mixture at a constant rate over a 30 h period. The temperature of the reaction mixture was maintained at −35.0±1.5° C. during the duration of the reaction to ensure good product reproducibility between batches.

The reactants were typically permitted to react for 46 h, after which the polyaniline precipitate was filtered from the reaction mixture and washed with about 25 L of water. The wet polyaniline filter cake was then mixed with a solution of 0.8 L of 28% ammonium hydroxide solution mixed with 20 L of water and stirred for 1 h, after which the pH of the suspension was 9.4.

The polyaniline slurry was then filtered and the polyaniline filtrate washed 4 times with 10 L of water per wash, followed by a washing with 2 L of isopropanol. The resulting polyaniline filter cake was placed in plastic trays and dried in an oven at 35° C. until the water content was below 5 mass %. The recovered mass of dried polyaniline was 974 g (10.7 moles) corresponding to a yield of 93.4%. The dried powder was sealed in a plastic bag and stored in a freezer at −18° C. The weight average molecular weight ($M_w$) of the powder was found to be 280,000 g·mol$^{-1}$, although $M_w$ values between about 100,000 and about 350,000 g·mol$^{-1}$ have been obtained using this synthesis by controlling the reaction temperature between 0 and −35° C., respectively. The GPC molecular weight data was obtained using a 0.02 mass % solution of EB in NMP containing 0.02 mass % lithium tetrafluoroborate. The flow rate of the solution was 1 mL·min.$^{-1}$, and the column temperature was 60° C. The Waters HR5E column utilized was calibrated using Polymer Labs PS1 polystyrene standards.

B. Preparation of Solid PANI.AMPSA Fibers:

Fibers used in Examples 1 to 5 were prepared according to the method outlined in WO 99/24991, the teachings of which are hereby incorporated by reference herein. Emeraldine base polyaniline powder (4.22 g) synthesized at −35° C. in phosphoric acid in accordance with the synthesis set forth hereinabove ($M_w$=280,000 g/mol) and AMPSA (5.78 g) were ground together for 5 min. using a mortar and pestle. The gray powder was then placed inside a glove bag together with dichloroacetic acid (DCAA, 190 g), and the bag was filled with nitrogen gas. The powder was added gradually to the DCAA solvent and homogenized as described below for Examples 6 and 7. The thick solution was then sealed in what is known to those having skill in the art as a dope pot, and transferred to a fiber spin line. A nitrogen pressure of 100 psi was applied to one end of the dope pot. The other end of the dope pot was attached to a gear pump. The pumped spin solution was passed through 240 and 140 μm filters before being extruded through a 250 μm diameter spinneret into a 2-butanone coagulation bath. The nascent fiber was removed after approximately 10 min., allowed to dry overnight, and then stretched over a hot pin at 90° C. The nascent fibers were removed after 10 min. and allowed to dry overnight.

Fibers used in Examples 6 and 7 were prepared according to a slightly different method in order to obtain sufficient fiber to enable fabrication of polyaniline yarns. Emeraldine base polyaniline powder (84.2 g) synthesized at −35° C. in phosphoric acid in accordance with the synthesis set forth hereinabove ($M_w$=280,000 g/mol) and AMPSA (115.8 g) were added to a 2 L plastic vessel containing a ceramic grinding media. The contents were milled for 2 h, and 1.0 g of water was added to the jar contents 30 min. after the milling process was commenced.

PANI.AMPSA$_{0.6}$ powder (60.0 g) was added, with stirring, to DCM (940 g) over a 3 h period in a vessel that was maintained at a temperature between 10 and 15° C. to produce 1 kg of a 6 mass % solution. This assured that heat generated during the mixing process was removed. Stirring was performed using a Silverson SL4RT mixer having a duplex head immersed in the DCAA and stirred at 1500-2000 rpm. Generally, the mixing temperature for the preparation of solutions of PANI.AMPSA$_{0.6}$ powder in DCAA was kept below 35° C. at all times to prevent gelling. After the powder addition, the solution was left to mix for 18 h before being degassed under a dynamic vacuum of approximately 50 mbar for 1 h.

The degassed solution was placed inside of a pressure vessel and 20 psi of nitrogen gas pressure was applied to the vessel to direct the solution to the gear pump. The solution was passed through a 230 μm pore filter prior to entering the gear pump. The Mahr & Feinpruf gear pump included 2 interlocking cogs which deliver 0.08 cm$^3$ of solution per revolution. The gear pump was adjusted to deliver 1.3 cm$^3$ min.$^{-1}$ of the spin solution. The solution was then passed through 230 and 140 μm pore filters before entering a 250 μm diameter spinneret (l/d=4). The spinneret was immersed in an ethyl acetate coagulation bath (wet spinning). The fiber was passed through the coagulation bath for about 1 m before being taken up on a pair of rotating (12.0 rpm; 6.2 m·min.$^{-1}$.), 16.5 cm diameter godet drums immersed in a 1 M solution of phosphoric acid.

The fiber was then passed through a 1.2 m long heat tube maintained at a temperature of 90±10° C. and wound onto a second godet pair having the same diameter and the first pair, and turning at 15.6 rpm (8.1 m·min.$^{-1}$), thereby stretching the fiber with a 1.3:1 stretch ratio. The fiber was then collected on a 15 cm diameter bobbin turning at 18 rpm (8.5 m·min.$^{-1}$) and allowed to dry at ambient conditions. The fiber that was collected on the bobbin was then fabricated into 20-monofilament yarns having a twist ratio of 7.5 turns per inch (TPI).

C. Preparation of Hollow PANI.AMPSA Fibers:

A hollow fiber spinneret having an outer ring OD of 4 mm, an outer ring ID. of 2.5 mm, and an inner hole ID of 1.5 mm was used. Emeraldine base polyaniline powder (5.90 g) synthesized at −25° C. in phosphoric acid in accordance with the synthesis set forth hereinabove ($M_w$=200,000 g/mol), and 8.10 g of AMPSA were ground together using a mortar and pestle, and the resulting powder was placed inside a glove bag together with 186 g of DCAA in a 250 ml beaker. The glove bag was filled with nitrogen and the polyaniline powder slowly added to the DCM while homogenizing to give a 7 wt. % solution. After about 20 min., the thick green solution was transferred to a dope pot and extruded through the outer ring of the hollow fiber spinneret into isopropanol (IPA). Isopropanol was also pumped through the inner ring of the spinneret at a rate of 3 ml/min. using a peristaltic pump. Several meters of fiber were extruded into IPA and left to stand overnight before allowing them to dry for about a week, after which the fiber was still somewhat rubbery. Several lengths of the fiber were threaded over nichrome wire and heated to 90-100° C. The heated fiber was then stretched by about 100%. In order to perform conductivity measurements, it was necessary to dissect the fiber, thereby generating a flat film section having t=0.0650±0.0015 cm, w=0.110±0.005 cm and R=0.148±0.008Ω, from the conductivity is 237±31 S/cm. Typical dimensions of the hollow fibers were OD=3 mm, ID=2 mm, and a wall thickness=0.5 mm.

D. Preparation of PANI.AMPSA Films:

For the preparation of films, 0.19 g of the emeraldine base form of polyaniline and 0.26 g of AMPSA were ground together for 5 min. using a mortar and pestle. The gray powder was dissolved in a solvent mixture of 5.9 g of DCM and 23.6 g of formic acid. The mixture was homogenized for 5 min. at about 15,000 rpm using an Ultra-Turrax T25 homogenizer to give a green solution of emeraldine salt. A 5.3 g portion of the homogenized solution was placed on a glass microscope slide (5×7 cm) in an oven at 55° C. After 2 h, the slide was removed, allowed to cool to ambient temperature, and exposed to acetone for 15 min. The polymer film was then removed from the glass substrate and cut into strips measuring approximately 0.2×7 cm.

The PANI.AMPSA films and solid fibers were stretched approximately 200% by gripping the ends and pulling slowly at 90° C. over a heat source (a soldering iron tip wrapped with a thin section of PTFE plastic). This has the effect of aligning the polymer chains approximately parallel to the stretch direction, thereby increasing the tensile strength, Young's modulus, and electrical conductivity along the alignment axis (See, e.g., A. Andreatta et al., Mol. Cryst. Liq. Cryst. 189, 169 (1990); and J. M. Machado, Polymer 30,1992 (1989).). The stretched PANI.AMPSA films had a thickness of about 20 μm and an electrical conductivity of approximately 400 S/cm. The stretched solid fibers had a diameter of about 80 μm and an electrical conductivity of approximately 1000 S/cm, and the stretched hollow fibers had an outside diameter of 1.5 mm, an inside diameter of 1 mm, a wall thickness of 250 μm, and an electrical conductivity of approximately 400 S/cm.

E. Dopant Exchange for PANI.AMPSA:

The as-spun PANI.AMPSA fibers were used directly in aqueous 1 M HCl without any pretreatment; however, for non-aqueous conditions, PANI.AMPSA fibers were subjected to dopant exchange followed by drying. To accomplish this, the PANI.AMPSA materials were electrochemically redoped by potential cycling between −0.2 and 0.6 V (vs. Ag/AgCl) in 1 M $CF_3SO_3H$ until stable cyclic voltammograms were obtained, and then held at 0.6 V for 5 min. The resulting $PANI.CF_3SO_3$ fibers were then dried under dynamic vacuum for 24 h. The materials were then suitable for use in 1 M $LiClO_4$/PC (or other salt containing PC solutions), or for the fabrication of actuators with gel electrolytes.

F. Preparation of the Polyacrylonitrile Nanofiber Non-Woven Mat:

The polyacrylonitrile (PAN) nanofiber non-woven mat was formed by electrospinning, in which a high voltage is generated between a positively charged polymer solution and a metallic electrode onto which the non-woven mat is deposited. A 5 ml glass syringe was filled with a 10% PAN/dimethylformamide (DMF) solution and connected to a Becton Dickinson 18 hypodermic needle. The tip of the needle was filed to produce a flat end. The needle was connected to the output of a variable high voltage power supply purchased from Gamma High Voltage Research. The non-woven mat was deposited onto a 10×10 cm aluminum plate that was placed 20 cm horizontally from the tip of the hypodermic needle as the grounded counter electrode. A potential difference was applied between the hypodermic needle and the counter electrode was 20 kV until the thickness of the PAN non-woven mat reached approx. 1 mm.

G. Electrochemical and Electromechanical Measurements:

Electrochemical measurements of polymer samples were performed using a three-electrode electrochemical cell using an EcoChemie pgstat30 potentiostat. In aqueous HCl, this system consisted of a polymer sample as the working electrode, a 1.5 mm diameter platinum wire as the counter electrode, and an Ag/AgCl (3M NaCl) reference electrode. For PC electrolytes, a 1.0 mm diameter silver wire was utilized as a quasi-reference electrode.

For measuring linear actuation, the polymer sample was partially immersed in an electrolyte in the electrochemical cell described hereinabove. One end of the sample was clamped to the bottom of the cell, and inside the clamp it was electrically contacted by a platinum plate. This contact was connected to the working electrode of the potentiostat. The other end of the sample was fixed with epoxy resin onto the tip of the arm of a lever arm system (Aurora Scientific, model 300B), such that the upper approximately 2 cm portion of the sample was located in the air, and the lower portion, about 1 cm in length, was immersed in the electrolyte. A load (usually 1 g) was applied through the arm of the lever arm system to the sample to maintain it in a straight and slightly taut condition.

Electrochemical and electromechanical measurements of all polymer solid-in-hollow fiber actuators were performed in a similar manner to that described hereinabove, except that no reference electrode was required. The solid fiber working electrode and the hollow fiber counter electrode were directly connected to the potentiostat. For measuring linear actuation, the bottom end and the top end of the solid fiber was fixed with epoxy resin onto a base and onto the tip of a lever arm system, respectively. A 1 g load was applied to the solid fiber to maintain it in a straight and slightly taut condition.

Upon electrochemical stimulation from the potentiostat, the isotonic length change and isometric force change of the polymer were measured. For isotonic measurements, a fixed force was applied to the polymer sample and the position of the lever arm was recorded. This corresponds to the length change of the polymer sample resulting from redox reactions. For isometric measurements, the arm position, and thus the length of polymer sample was fixed, and the generated force of the polymer sample resulting from its redox reactions was recorded.

Having generally described the present invention, the following Examples further illustrate its characteristics.

EXAMPLE 1

Importance of High Conductivity for Eliminating Metal Backing:

It is known that for polyaniline having low conductivity, a metal backing is necessary to ensure a uniform potential distribution along the length of polymer. A comparison of the electroactivity of these highly conductive PANI.AMPSA films in HCl with and without a gold backing prepared by gilding (W. Lu et al., Proc. SPIE 4329 (2001) 505) is shown in FIG. 1, curves a-d, hereof. In both cases, two pairs of peaks were obtained, corresponding to the two redox processes of polyaniline (See, e.g., W. Huang et al., A. G. J. Chem. Soc., Faraday Trans. 82, 2385 (1986).); that is, leucoemeraldine ↔ emeraldine in the lower and emeraldine ↔ pernigraniline in the upper potential ranges. The identical electroactivity shows that this material can be used without a metal backing for at least 1 cm lengths due to its high conductivity. By contrast, no apparent electroactivity was observed for low-conductivity polyanilines (conductivity: approximately 1 S/cm) without gilding (See, e.g., W. Lu et al., Proc. SPIE 4329, 505 (2001).), which can be confirmed by a flat CV curve (d) shown in FIG. 1. Furthermore, the oxidation peak at E>1.0 V observed for the gilded PANI.AMPSA film (curve (a) of FIG. 1) due to the oxidation of the attached gold layer (curve (c) of FIG. 1) was eliminated (curve (b) of FIG. 1).

EXAMPLE 2

Figure 2A:
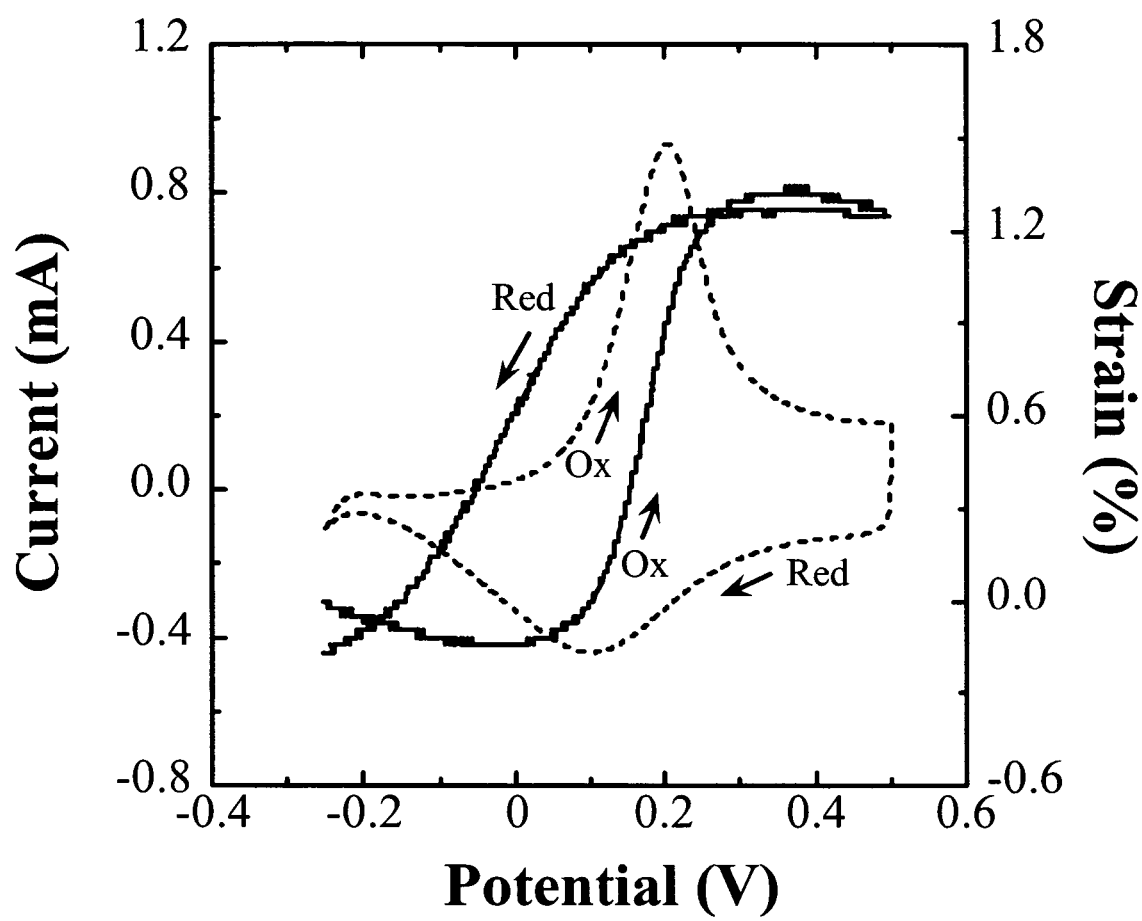
Figure 2B:
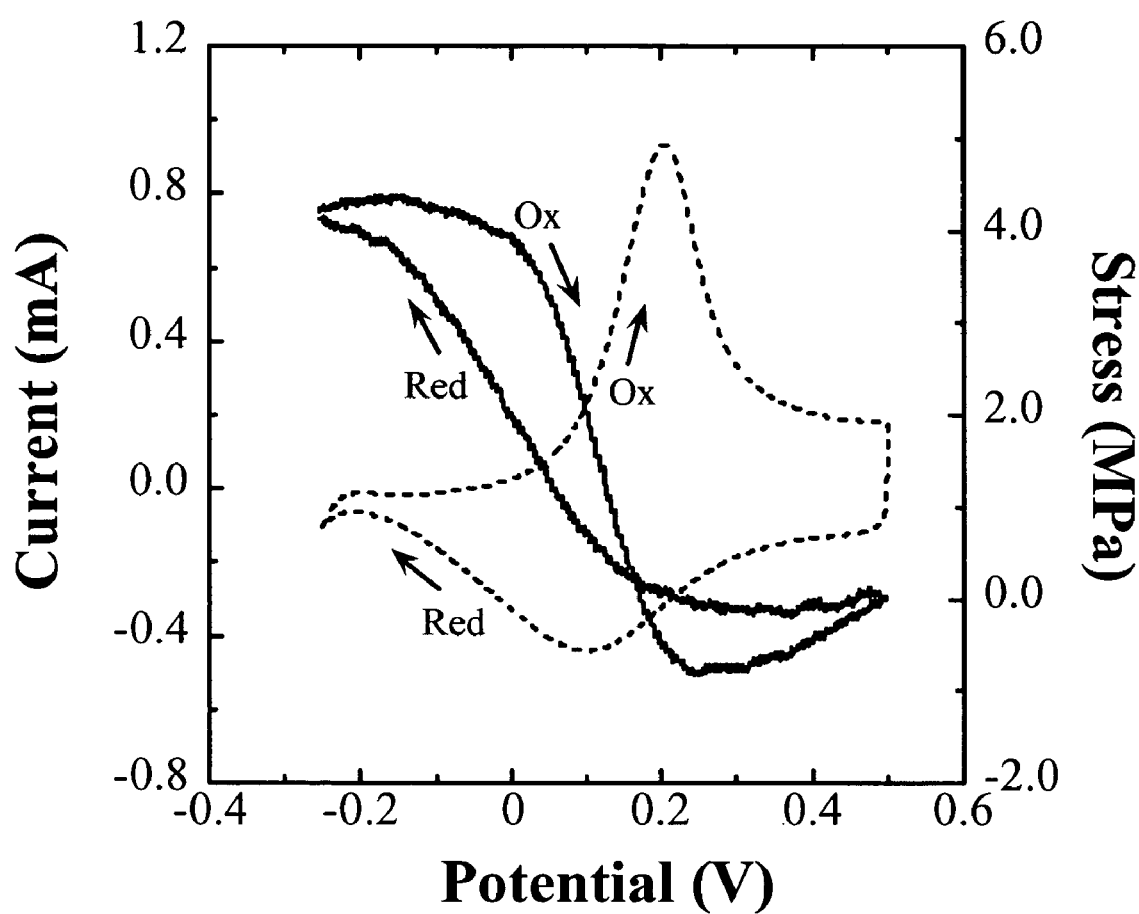
FIG. 2b shows the cyclic voltammogram (dashed line) and force change (solid line) for a PANI.AMPSA film in 1 M HCl, both taken at a scan rate of 5 mV/s.

Electroactivity and Actuation of PANI.AMPSA Films in HCl:

The electrochemical linear actuation of free-standing PANI.AMPSA films (without metal backing) in aqueous 1 M HCl was investigated. To avoid polyaniline degradation in this electrolyte, the potential range was kept below 0.5 V, covering only the first redox process of polyaniline. Typical cyclic voltammograms, length change, and force change upon potential cycling are shown in FIG. 2. Expansion/contraction (FIG. 2a) and decrease/increase in force (FIG. 2b) were obtained. It is believed by the present inventors that this actuation behavior is predominantly due to anion insertion upon oxidation and anion expulsion upon reduction of polyaniline in aqueous acidic electrolytes (See, e.g., G. Horanyi, and G. Inzelt, Electrochim. Acta 33, 947 (1988); and M. Kaneko et al., Synth. Met. 84, 795 (1997).).

EXAMPLE 3

Figure 3A:
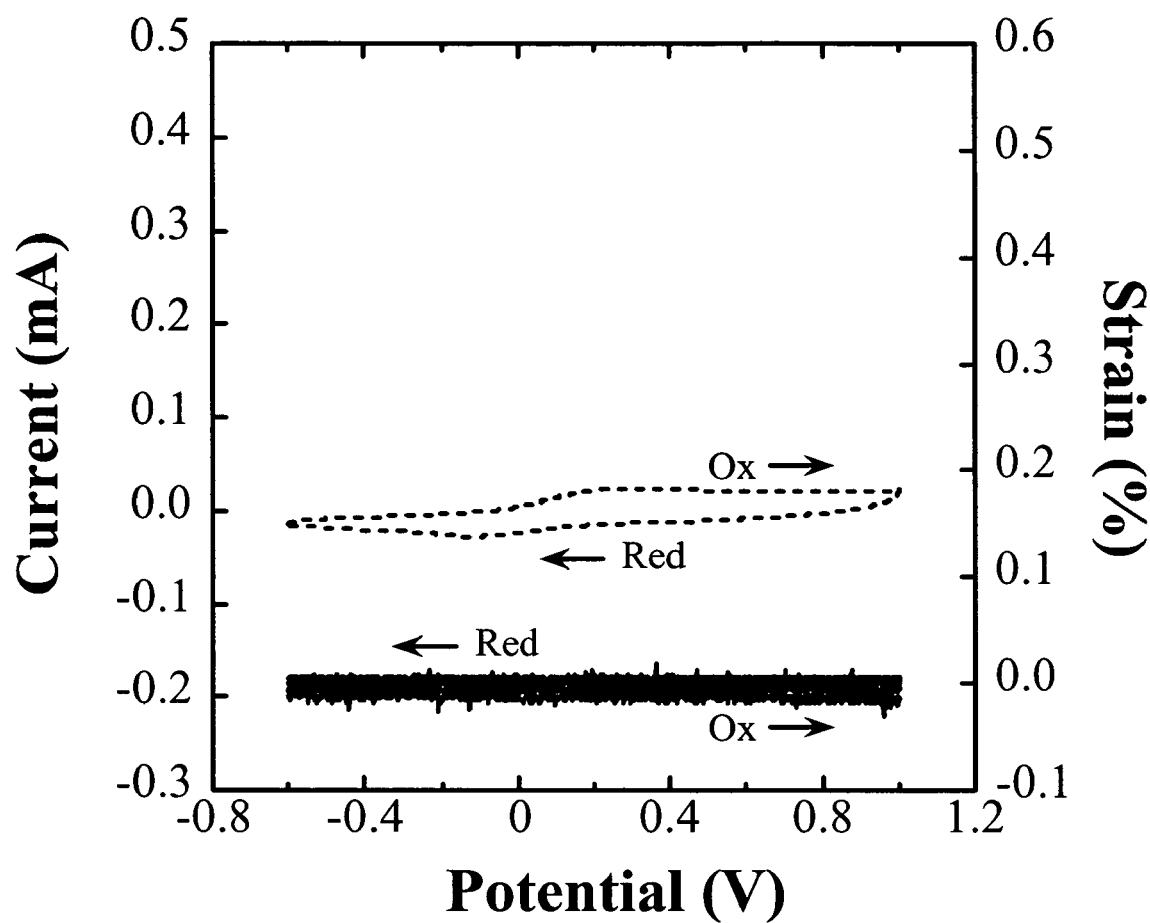
Figure 3B:
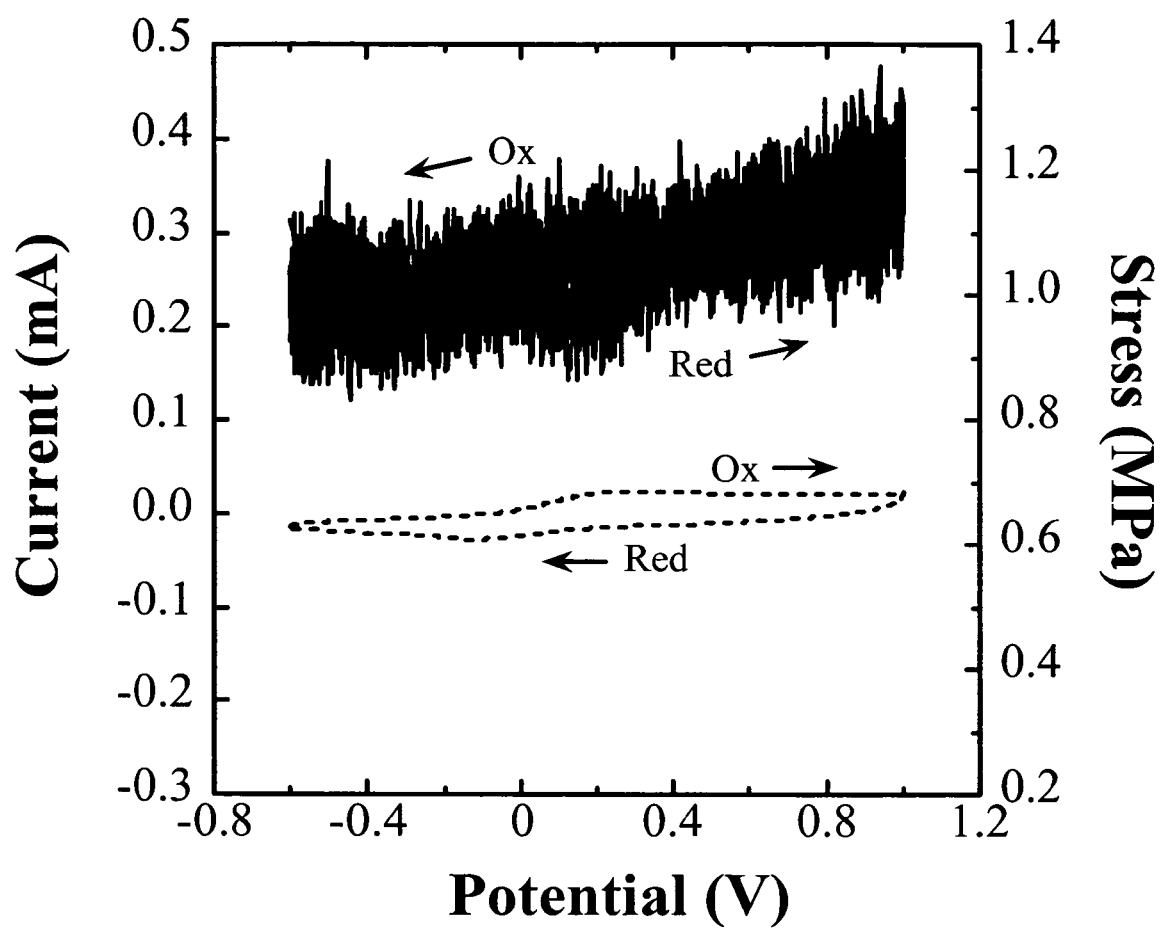
FIG. 3b shows the cyclic voltammogram (dashed line) and force change (solid line) for a PANI.AMPSA film in 1 M $LiClO_4$/PC, both taken at a scan rate of 5 mV/s.
Figure 4A:
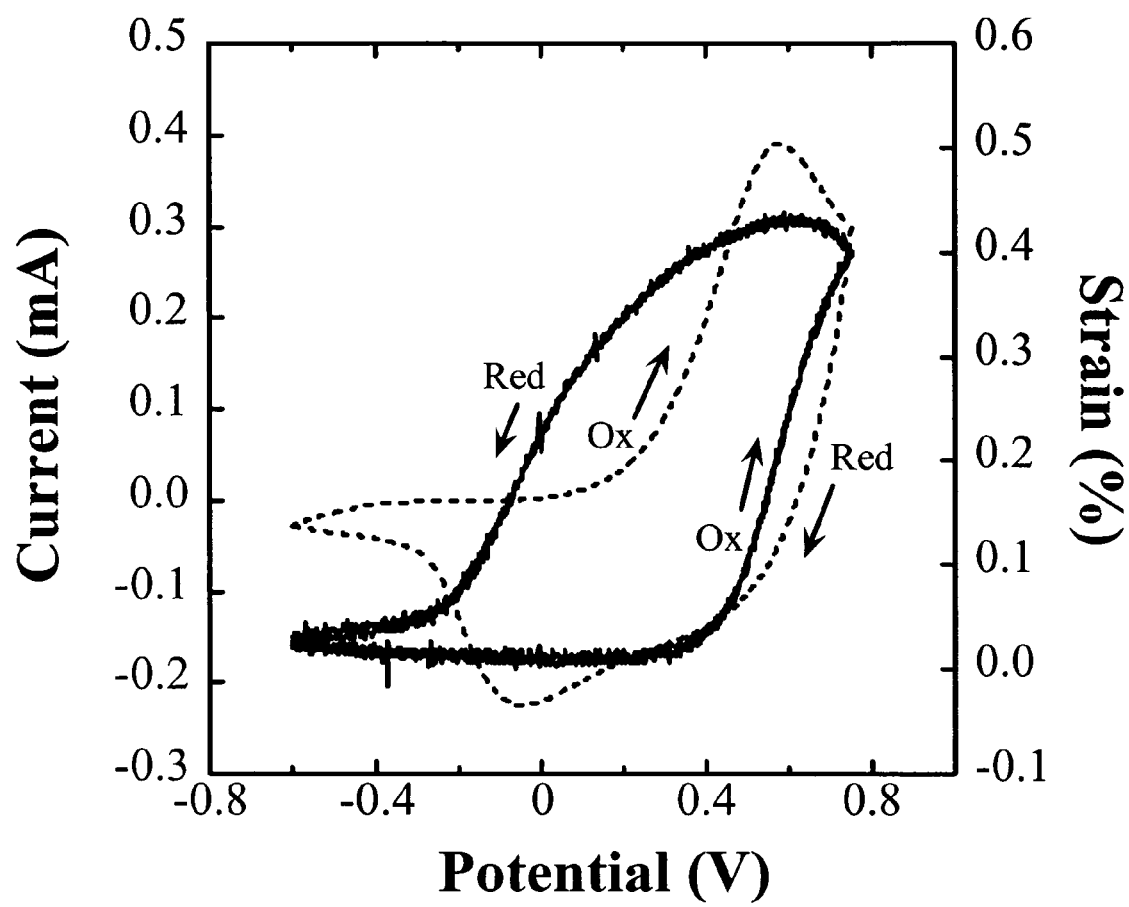
Figure 4B:
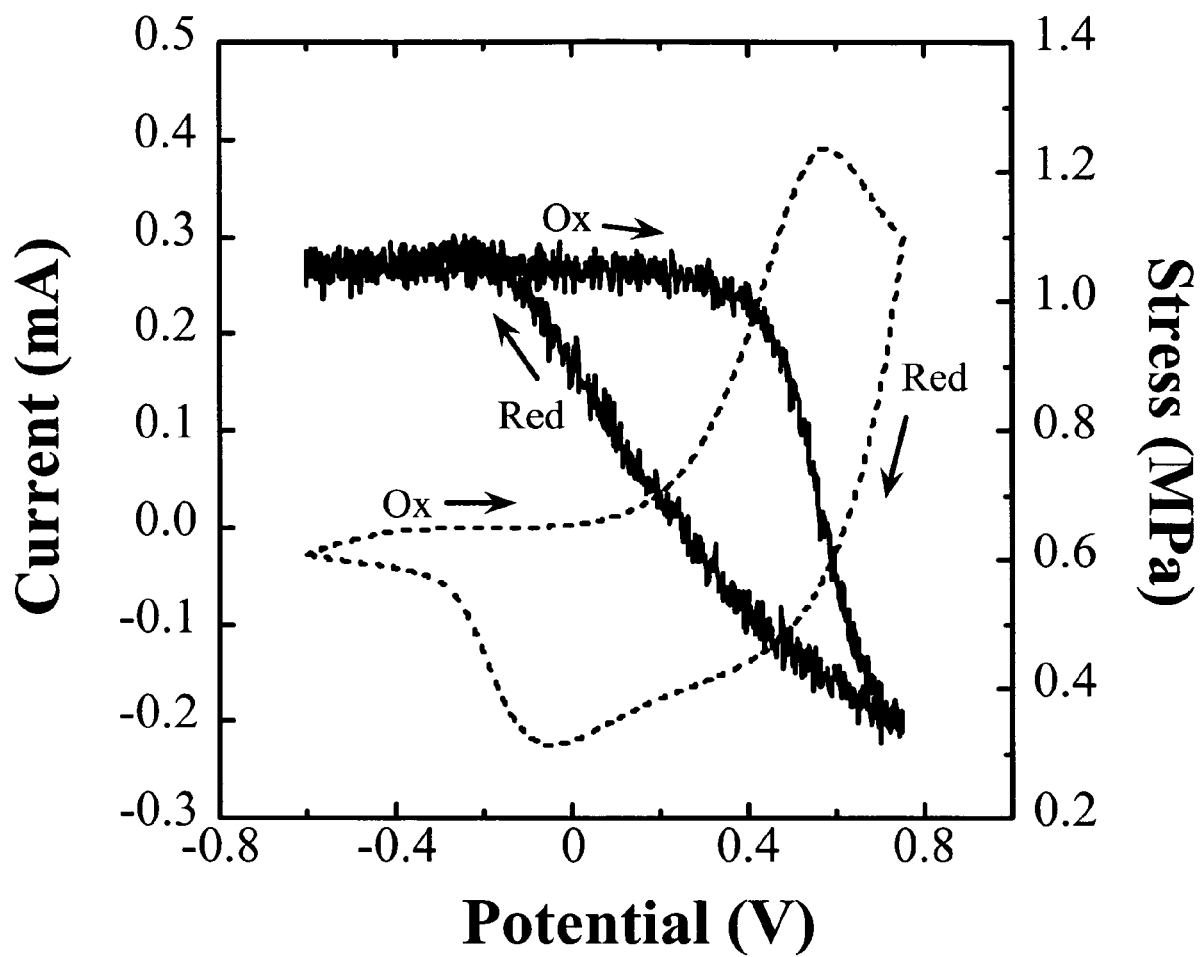
FIG. 4b shows the cyclic voltammogram (dashed line) and force change (solid line) for a PANI.$CF_3SO_3$ film in 1 M $LiClO_4$/PC, both taken at a scan rate of 5 mV/s, where the PANI.$CF_3SO_3$ film was prepared by dopant exchange from a PANI.AMPSA film.

Electroactivity and Actuation of PANI.AMPSA Films in PC:

Poor electroactivity and no actuation were initially encountered for PANI.AMPSA in PC as shown in FIG. 3. This was also observed for acetonitrile as an electrolyte. It is believed by the present inventors that this effect is due to the insolubility of AMPSA⁻ in PC, and thus the difficult transport of the anion into the polymer. Accordingly, to improve the electroactivity and actuation for PANI.AMPSA materials in non-aqueous electrolytes, dopant exchange procedures to replace AMPS⁻ with anions that are soluble in PC were developed. As described hereinabove, electrochemical redoping was used; the resulting PANI.CF$_3$SO$_3$ film showed 17 times greater electroactivity defined by redox peak currents (FIG. 4) than the PANI.AMPSA (FIG. 3) in the same 1 M LiClO$_4$/PC electrolyte. The redoped materials also had significant stress and strain, although the strain was substantially smaller than in HCl.

EXAMPLE 4

Effect of Supporting Electrolyte on Actuation of PANI AMPSA Fibers in PC:

PANI.AMPSA fibers were converted to PANI.CF$_3$SO$_3$ fibers prior to use. Cyclic voltammograms and length changes are shown in FIG. 5. The electroactivity of PANI.CF$_3$SO$_3$ fibers in LiCF$_3$COO/PC (FIG. 5a) was lower than in other electrolytes: a smaller current and no clear redox peaks were observed. This effect is believed by the present inventors to be due to the low ionic conductivity of LiCF$_3$COO/PC compared to the other electrolytes, indicating a low dissociation of LiCF$_3$COO in PC. See TABLE 1 which presents the volumes of various anions, and the conductivities of the corresponding Li salts. Reduced ion concentrations result in high electrolyte resistance and thus low polymer electroactivity. Consequently, there was no actuation.

TABLE 1

| Anion | Volume (Å³)* | Conductivity of Li salt at 0.1M in PC (mS/cm) |
|---|---|---|
| CF$_3$COO⁻ | 60 | 0.17 |
| ClO$_4$⁻ | 52 | 2.0 |
| BF$_4$⁻ | 48 | 1.7 |
| CF$_3$SO$_3$⁻ | 80 | 1.1 |
| N(CF$_3$SO$_2$)$_2$⁻ | 143 | 1.3 |

*calculated using Hyperchem software

Figure 5A:
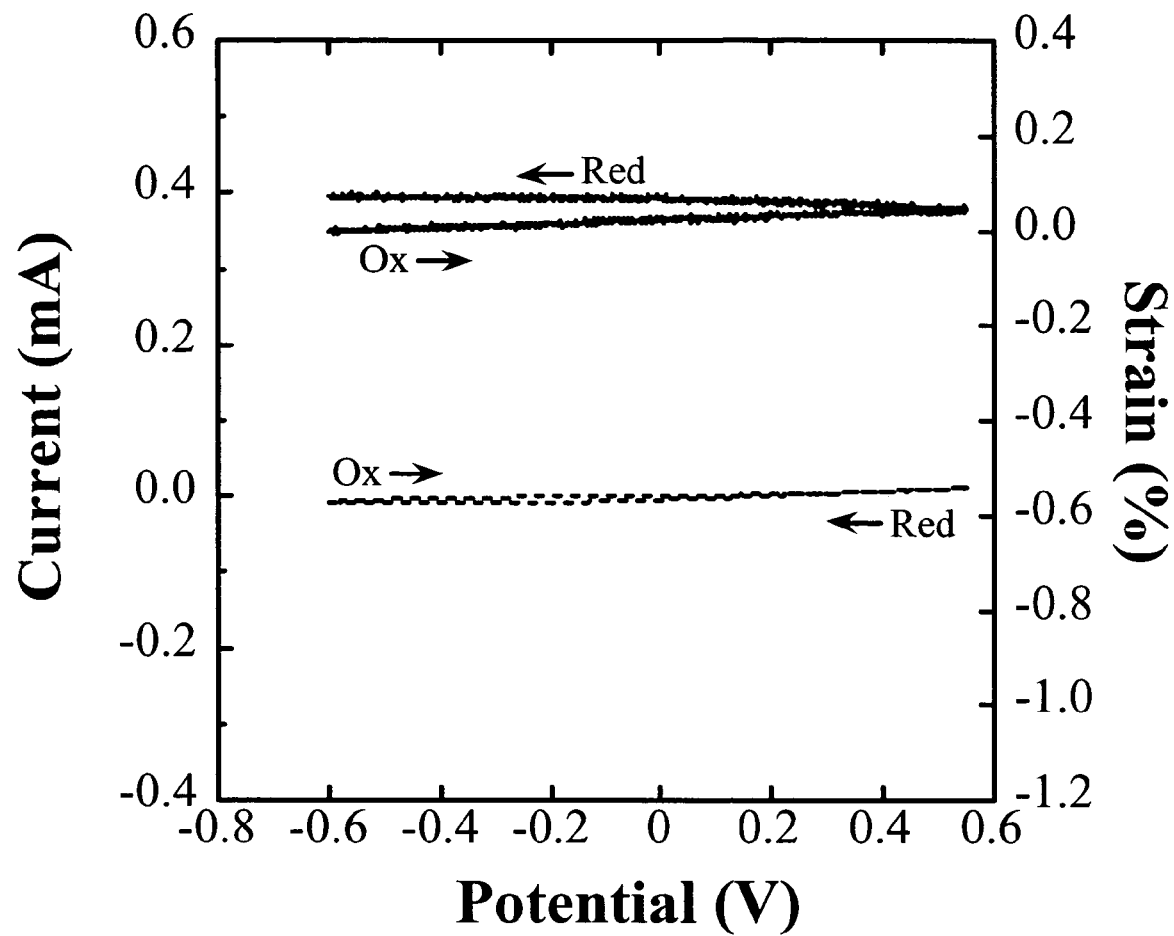
FIG. 5a shows the cyclic voltammogram (dashed line) and length change (solid line) for PANI.$CF_3SO_3$ fibers in 1 M $LiCF_3COO$/PC.
Figure 5B:
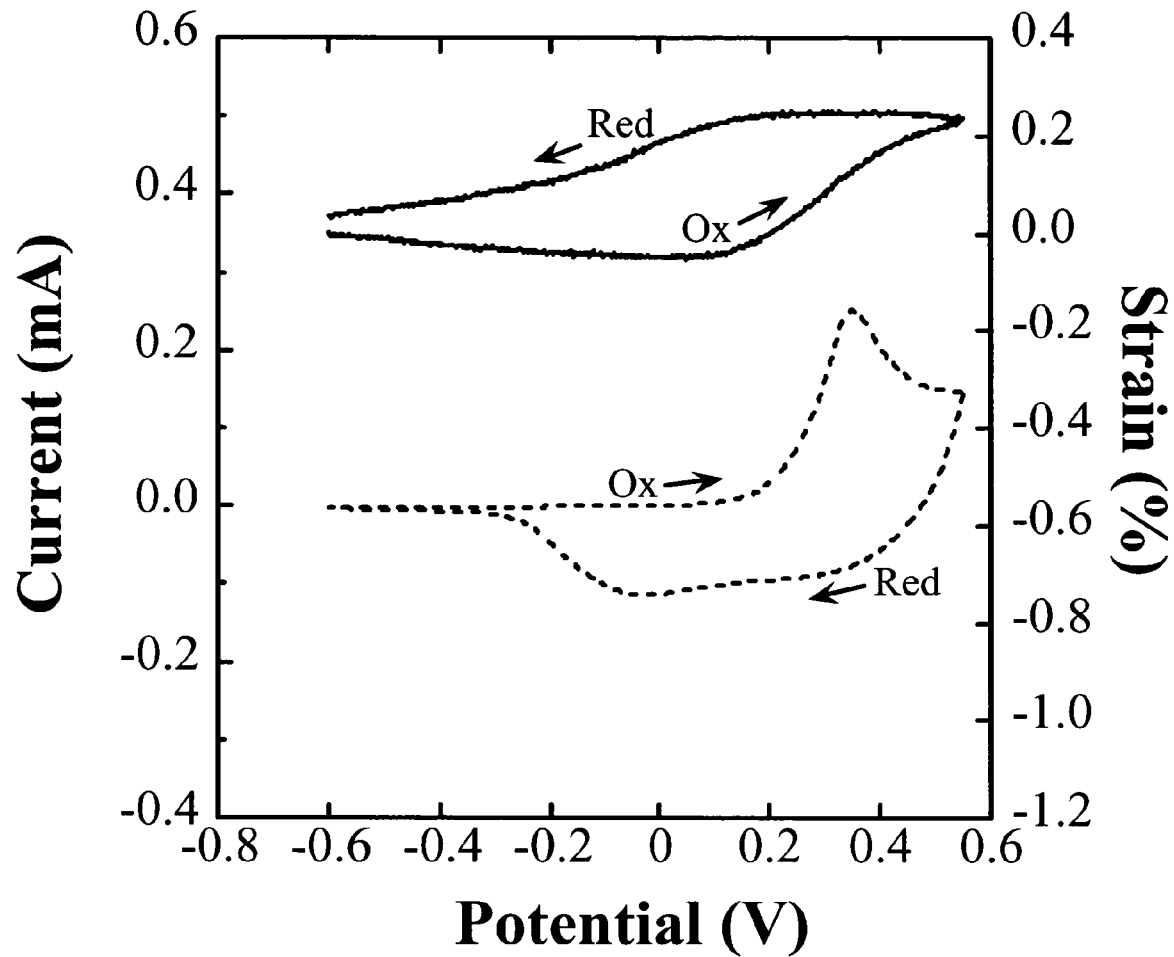
FIG. 5b shows the cyclic voltammogram (dashed line) and length change (solid line) for PANI.$CF_3SO_3$ fibers in 1 M $LiClO_4$/PC.
Figure 5C:
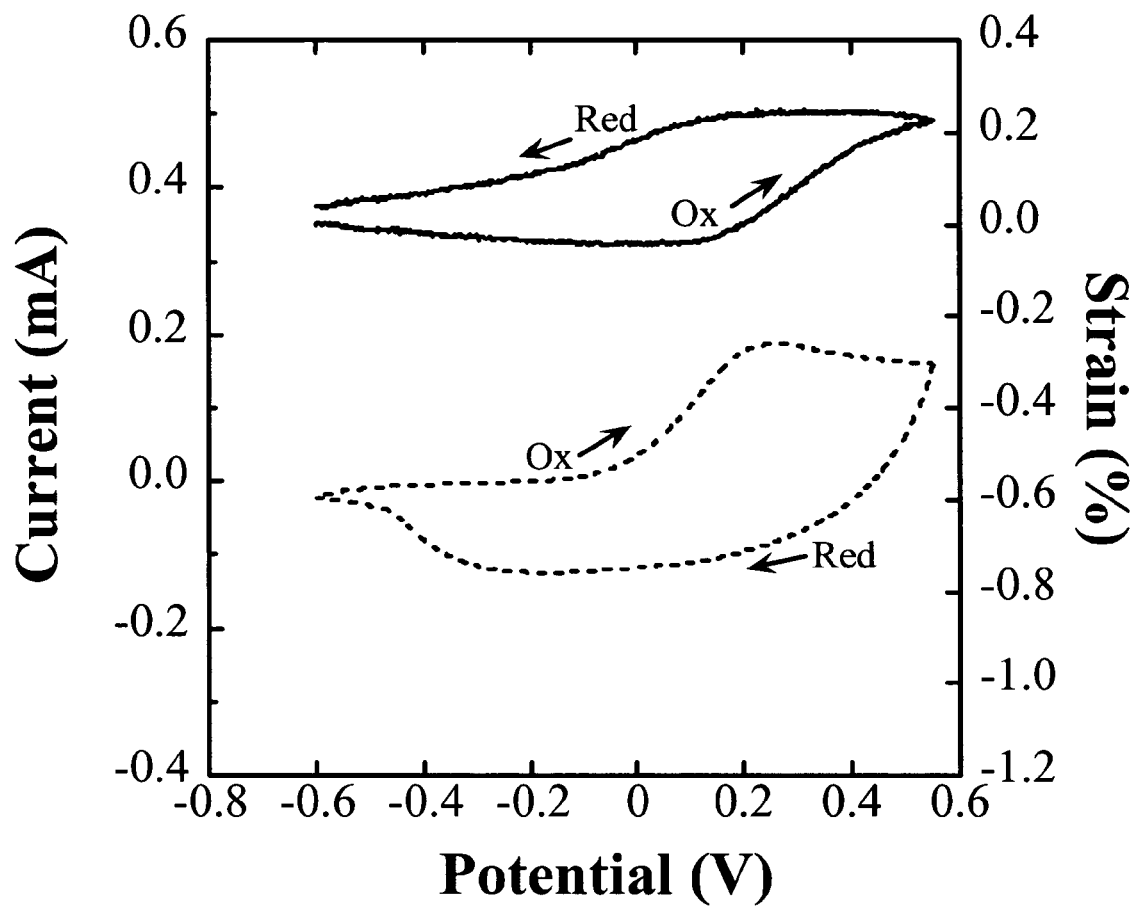
FIG. 5c shows the cyclic voltammogram (dashed line) and length change (solid line) for PANI.$CF_3SO_3$ fibers in 1 M $LiBF_4$/PC.
Figure 5D:
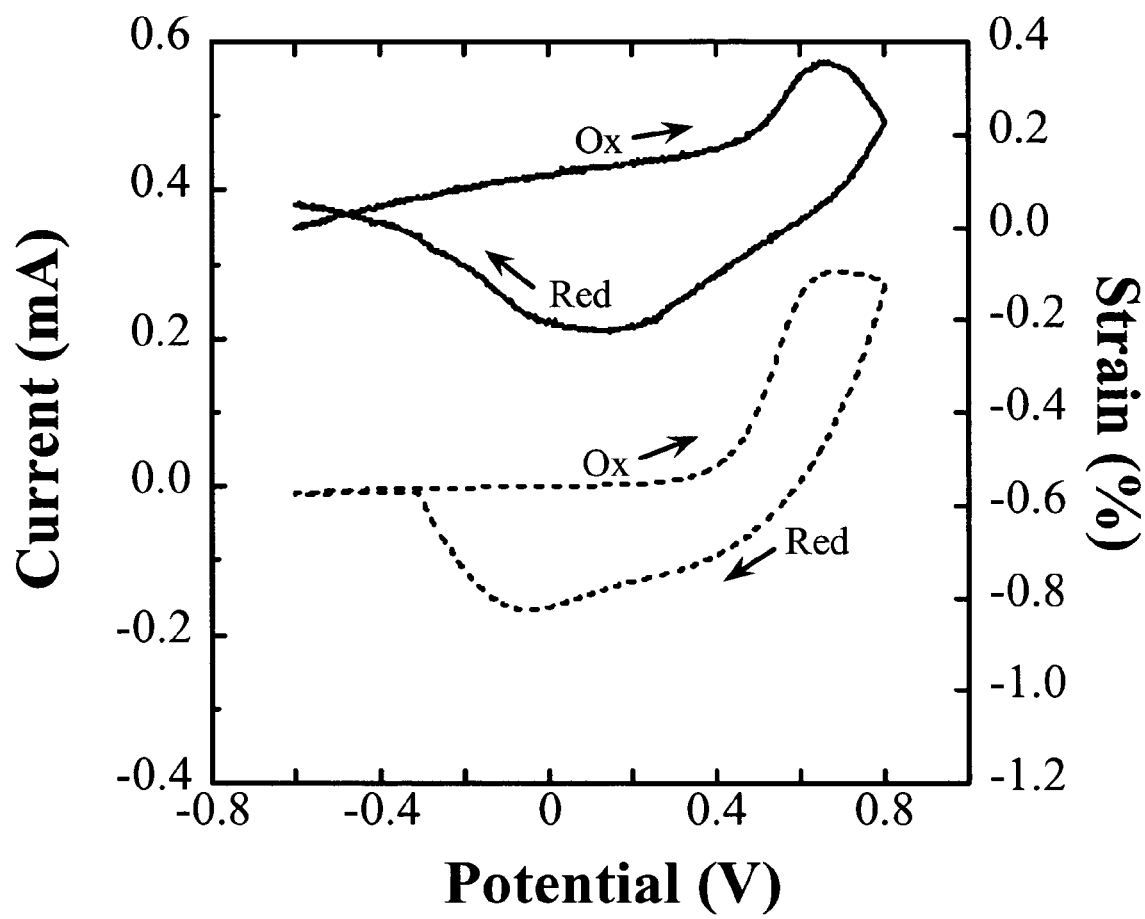
FIG. 5d shows the cyclic voltammogram (dashed line) and length change (solid line) for PANI.$CF_3SO_3$ fibers in 1 M $LiCF_3SO_3$/PC.
Figure 5E:
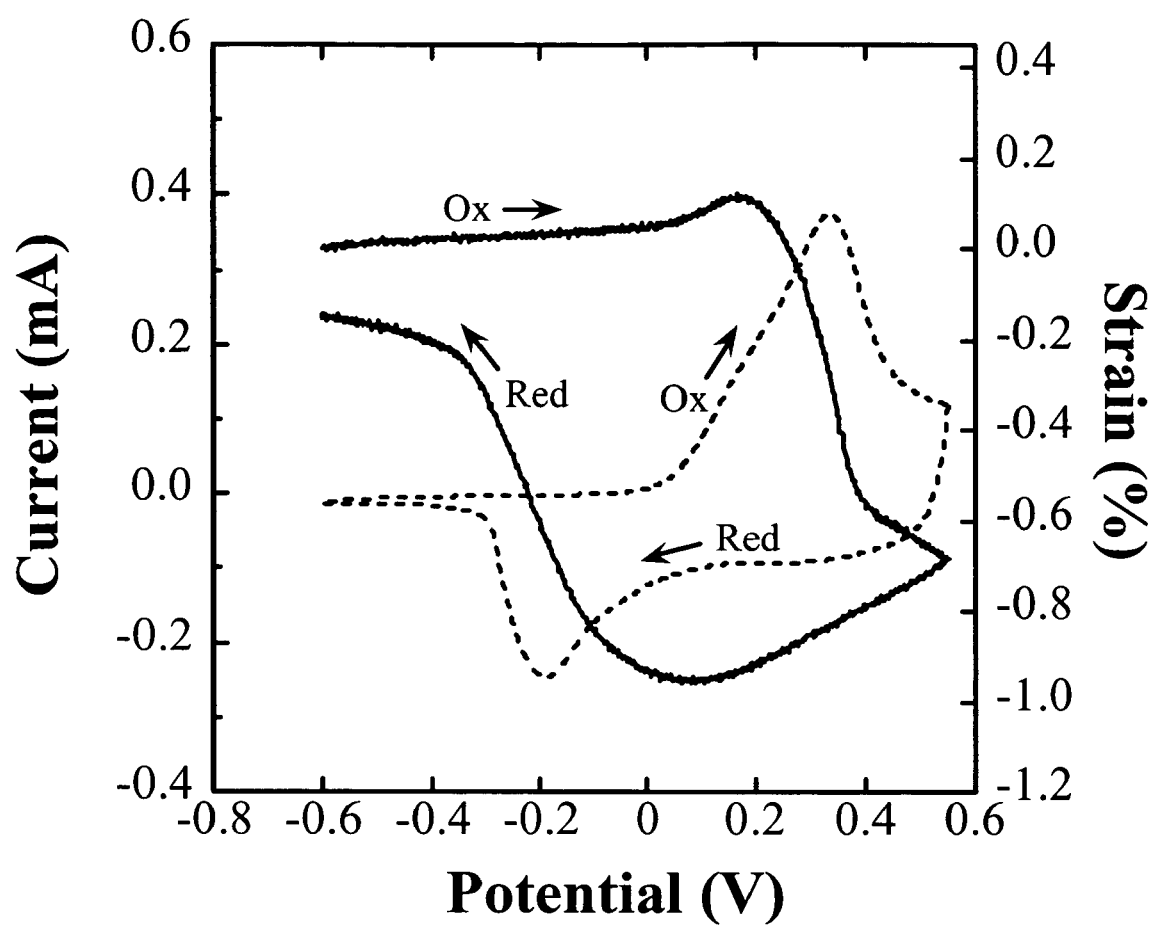
FIG. 5e shows the cyclic voltammogram (dashed line) and length change (solid line) for PANI.$CF_3SO_3$ fibers in 1 M $LiN(CF_3SO_2)_2$/PC, all taken at a scan rate of 5 mV/s.

In electrolytes having small anions, LiClO$_4$/PC (FIG. 5b) and LiBF$_4$/PC (FIG. 5c), the fibers expanded upon oxidation and contracted upon reduction as observed for the films (FIG. 4a), indicating anion exchange. In the electrolyte having a large anion, LiN(CF$_3$SO$_2$)$_2$/PC, PANI.CF$_3$SO$_3$ fibers contracted upon oxidation through deinsertion of cations (FIG. 5e). This effect has been observed previously.

When medium-size anions were used (i.e. CF$_3$SO$_3$⁻), the actuation behavior was more complex (FIG. 5d), as has been previously reported (See, e.g., Q. Pei and O. J. Inganäs, J. Phys. Chem. 96, 10507 (1992); and K. Naoi et al., J. Electrochem. Soc. 138, 440 (1991).), because of mixed anion and cation transport. The fibers expanded upon oxidation at potentials below 0.65 V (anion insertion), but contracted (cation expulsion). During the reverse scan, the fibers contracted upon reduction from 0.8 to 0.2 V, which might be due to the expulsion of anions, while they expanded upon further reduction below 0.2 V, presumably due to the insertion of cations.

The following redox diagram for polyaniline shows the fully reduced (leucoemeraldine) and a partially oxidized (emeraldine) states in non-aqueous electrolytes, where A⁻ and C⁺ represent the anion and cation of the electrolyte, respectively. Anion exchange is obtained for small anion-containing (for example, ClO$_4$⁻, or BF$_4$⁻) electrolytes, while cation exchange is obtained in large anion-containing (for example, N(CF$_3$SO$_2$)$_2$⁻) electrolytes. Mixed anion-cation exchange is obtained in medium—size anion-containing (for example, CF$_3$SO$_3$⁻) electrolytes.

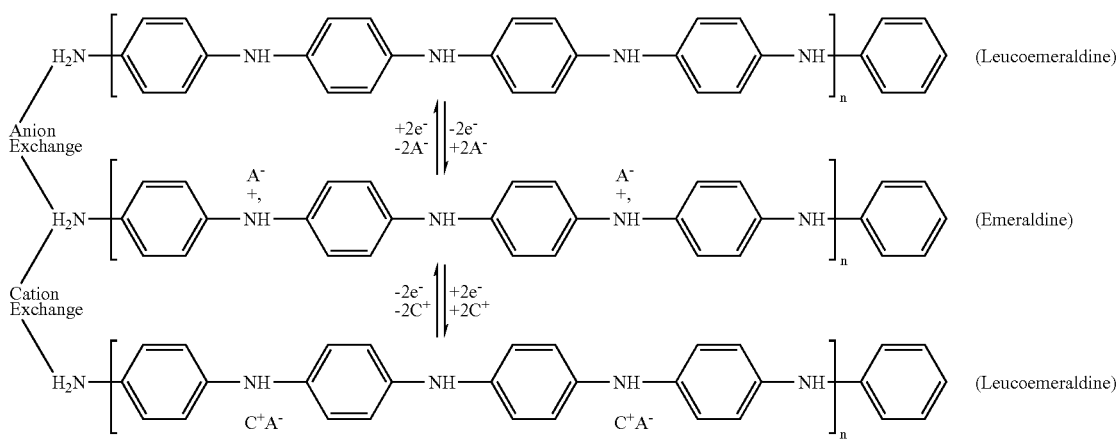

EXAMPLE 5

Figure 7:
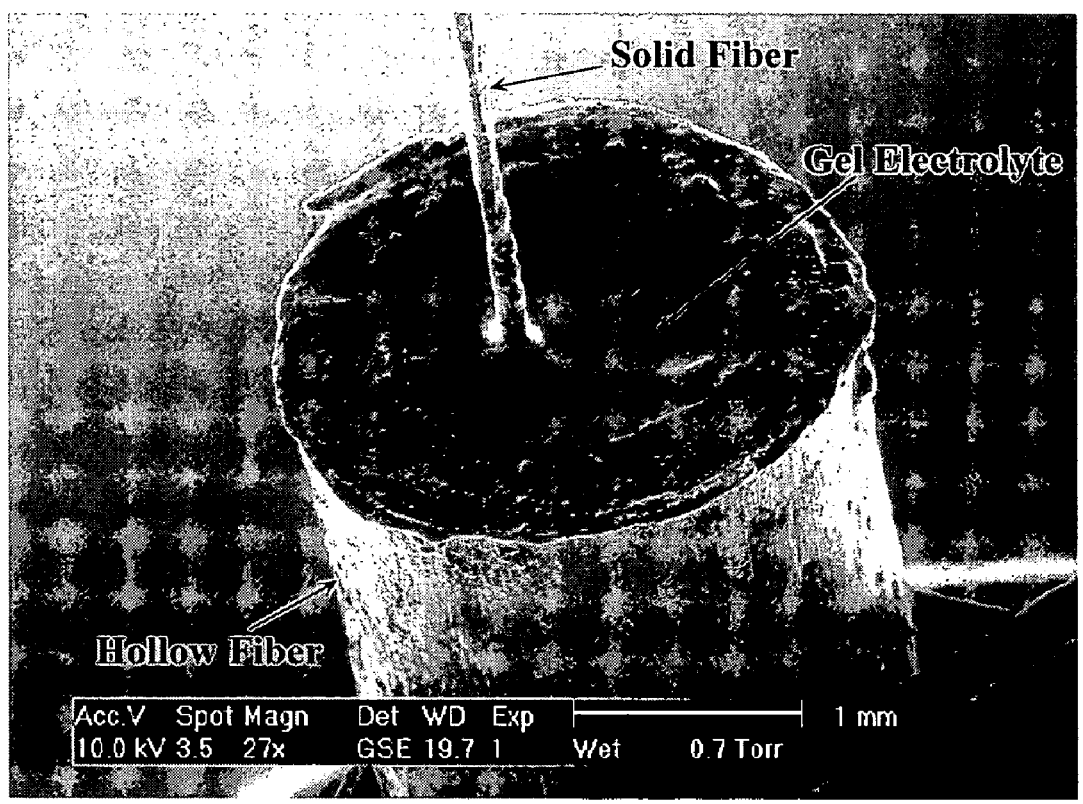
FIG. 7 is a scanning electron microscope (SEM) image for a PANI.$CF_3SO_3$ solid-in-hollow fiber linear actuator.

All-Polymer, Solid-in-Hollow Fiber Actuators:

Prior to their use in the fabrication of linear actuators linear actuators, dopants in both solid and hollow PANI-.AMPSA fibers were first dopant exchanged to form PANI.CF$_3$SO$_3$ fibers. The basic configuration of a solid-in-hollow fiber linear actuator is shown in FIG. 7. The solid conducting polymer fiber was centered in the hollow conducting polymer fiber to avoid electrical shorting. A gel electrolyte consisting of 29% PMMA, 48% EC, 19% PC, and 4% LiClO$_4$ (by weight) was then introduced into the space between the solid and hollow fibers with a syringe. During the operation of the actuator, voltage was applied between the solid fiber (as the working electrode) and the hollow fiber (as the counter electrode). No reference electrode was required since each electrode was capable of undergoing redox reactions.

Figure 6:
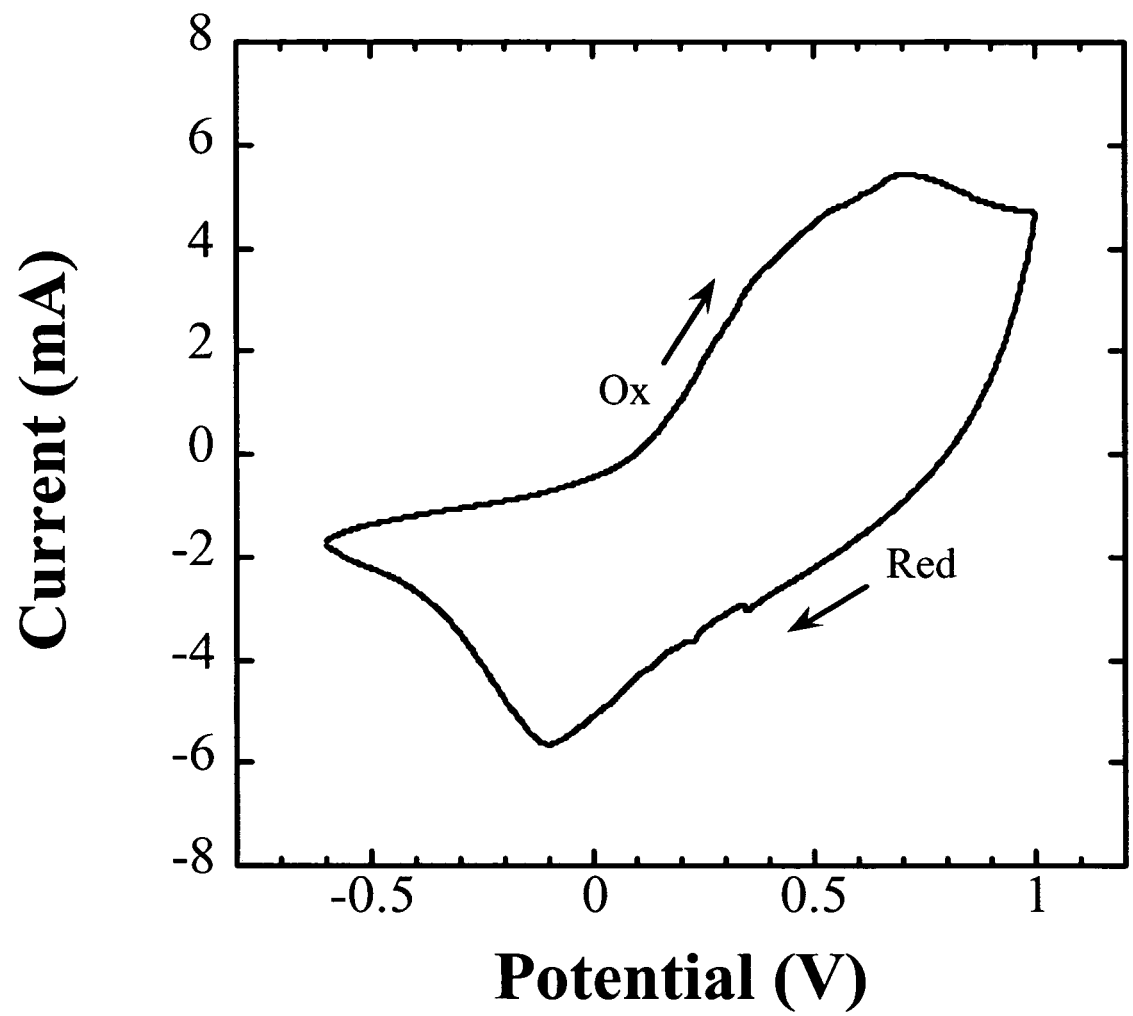
FIG. 6 shows the cyclic voltammogram of a PANI.$CF_3SO_3$ hollow fiber in 1 M $LiClO_4$/PC taken at a scan rate of 5 mV/s.
Figure 8:
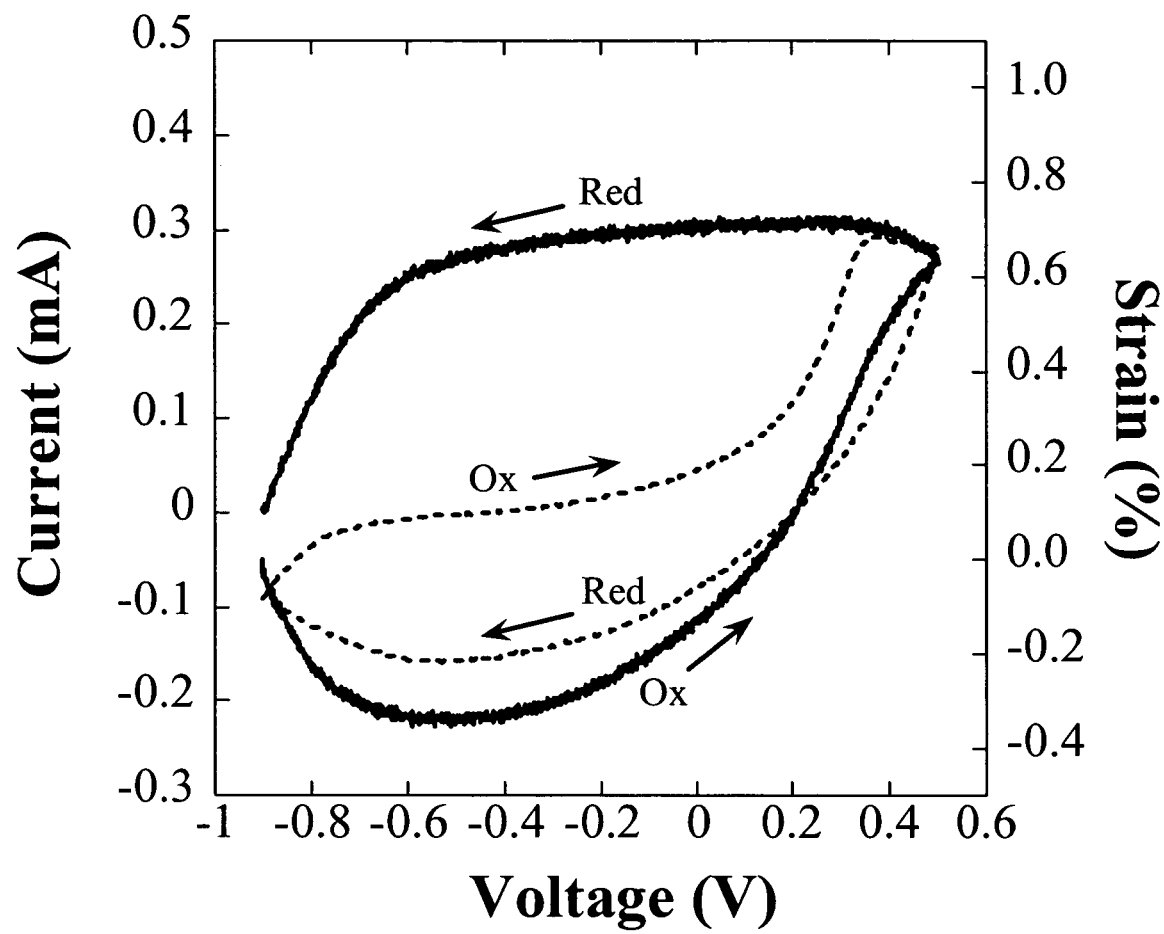
FIG. 8 shows the cyclic voltammogram (dashed line) and length change (solid line) for a solid-in-hollow fiber actuator taken at a scan rate of 5 mV/s, where the effective length of the solid fiber is 1 cm.
Figure 9A:
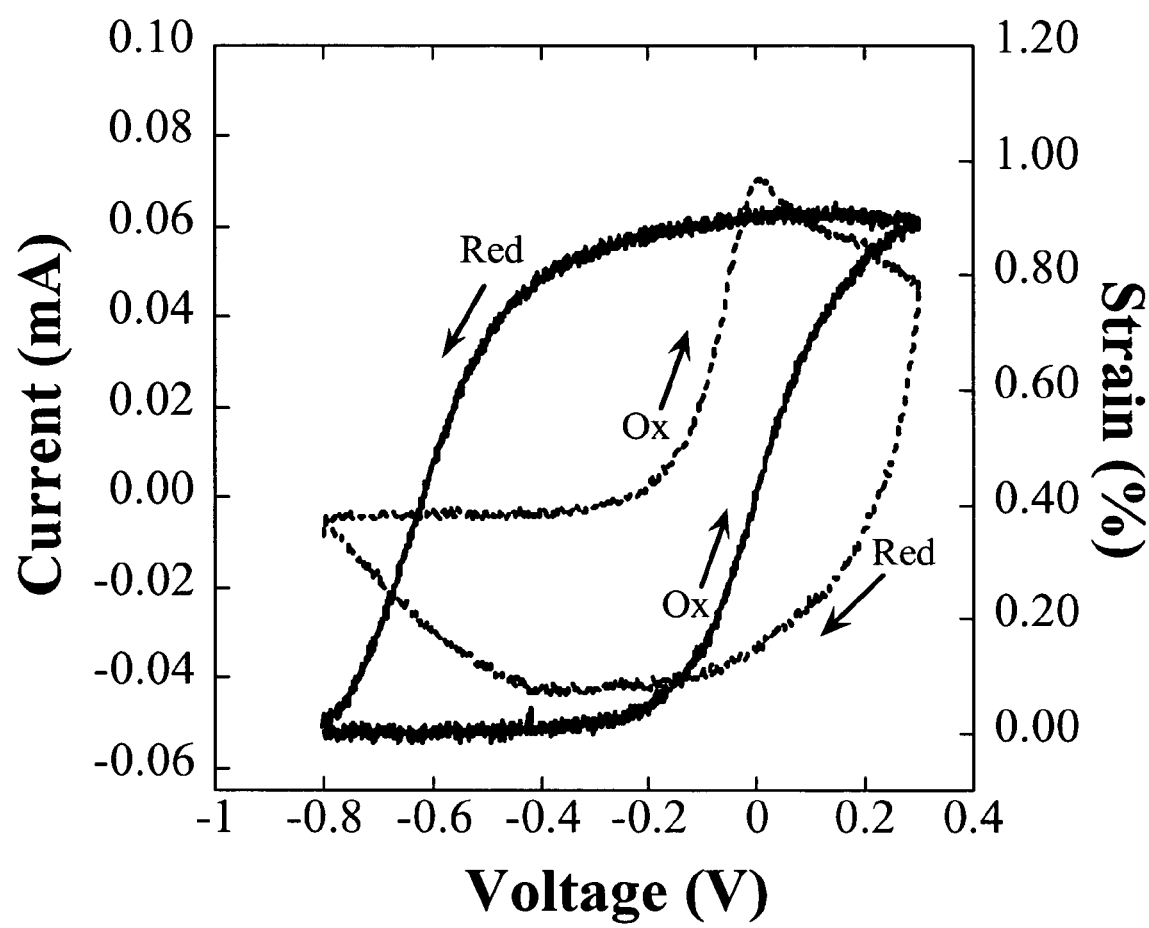
Figure 9B:
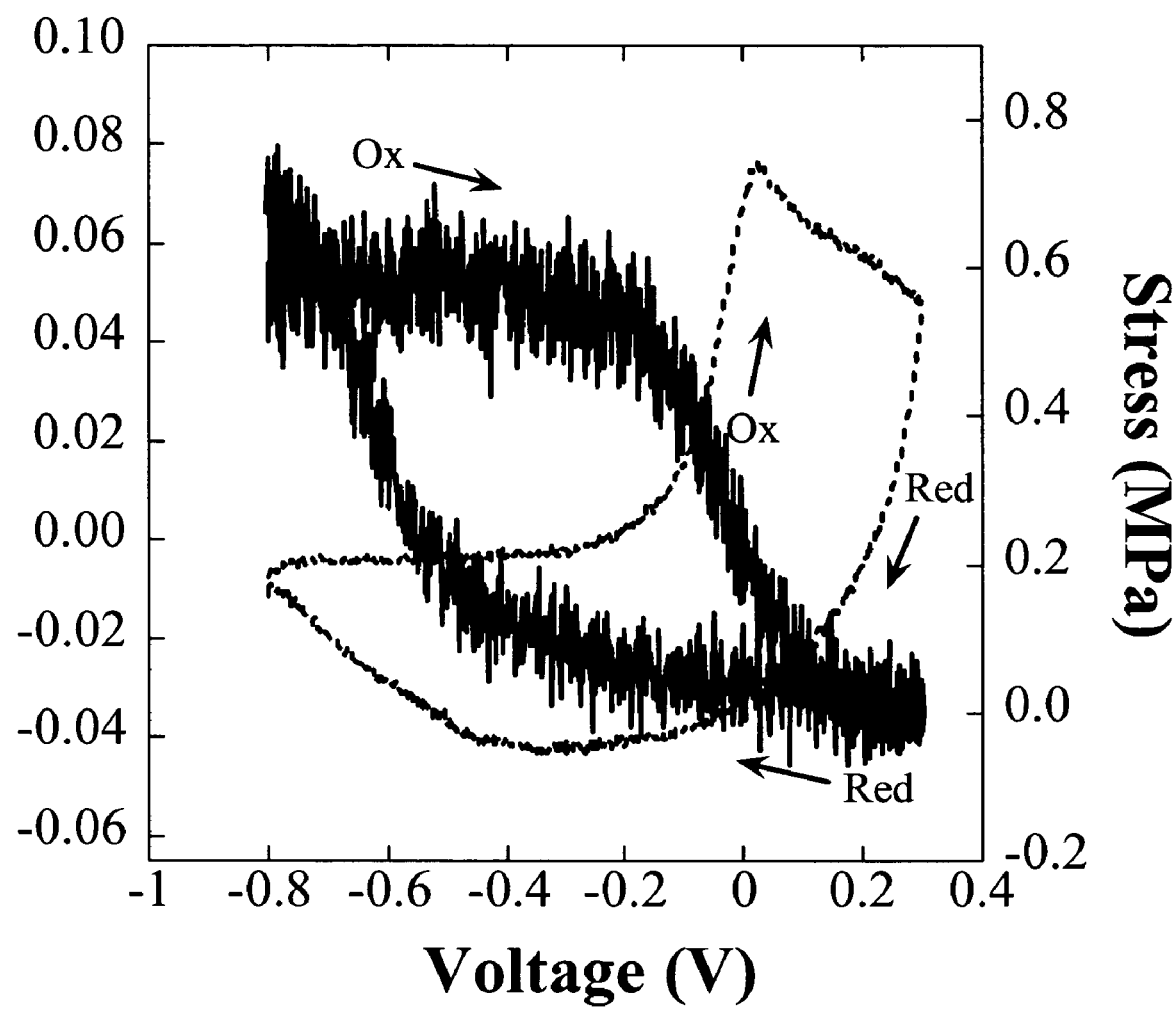
Figure 9C:
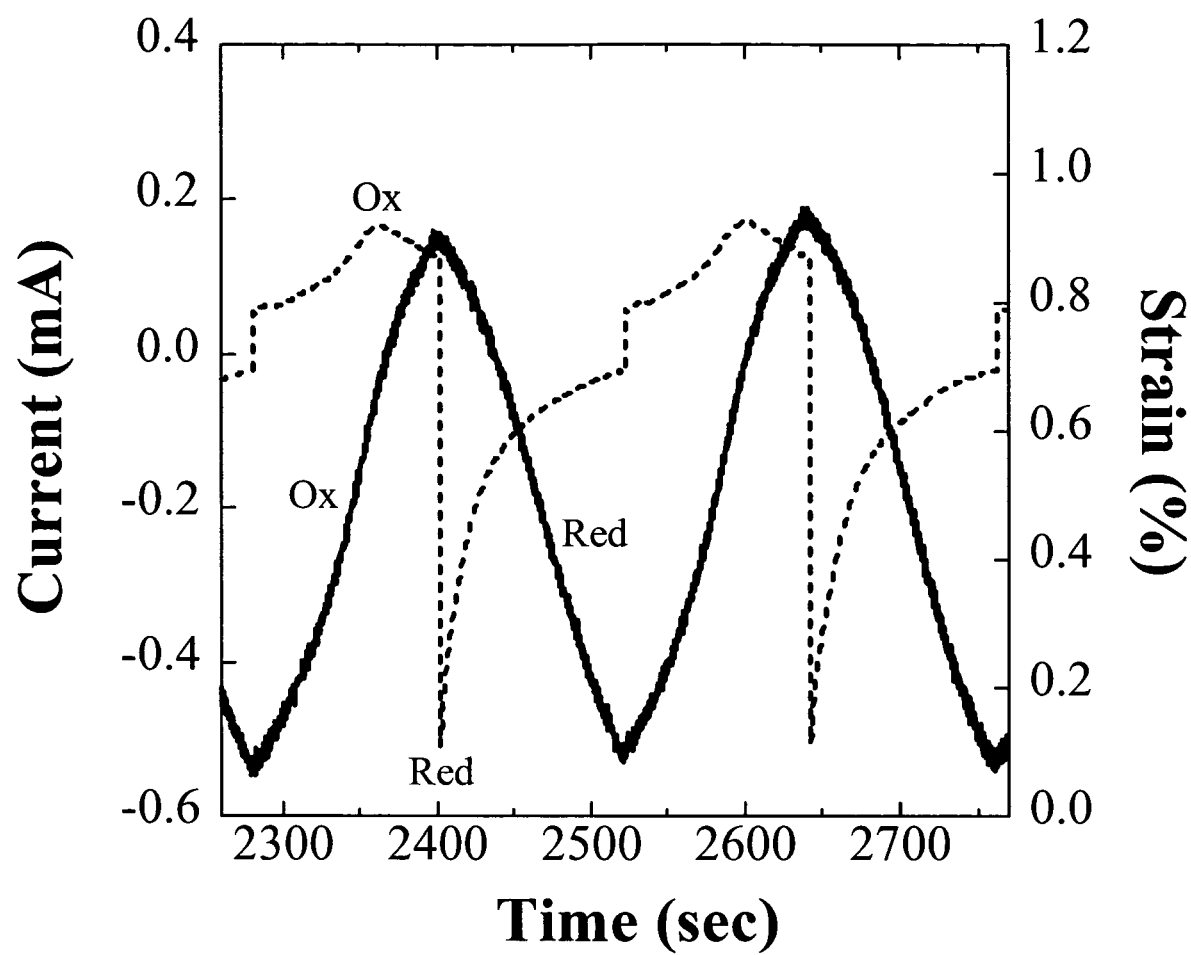
FIGS. 9c and 9d show the actuation profiles for voltage pulsing, where the pulse width for the chronoamperometry (dashed line) is 120 s for each step between −0.8 V and 0.3 V.
Figure 9D:
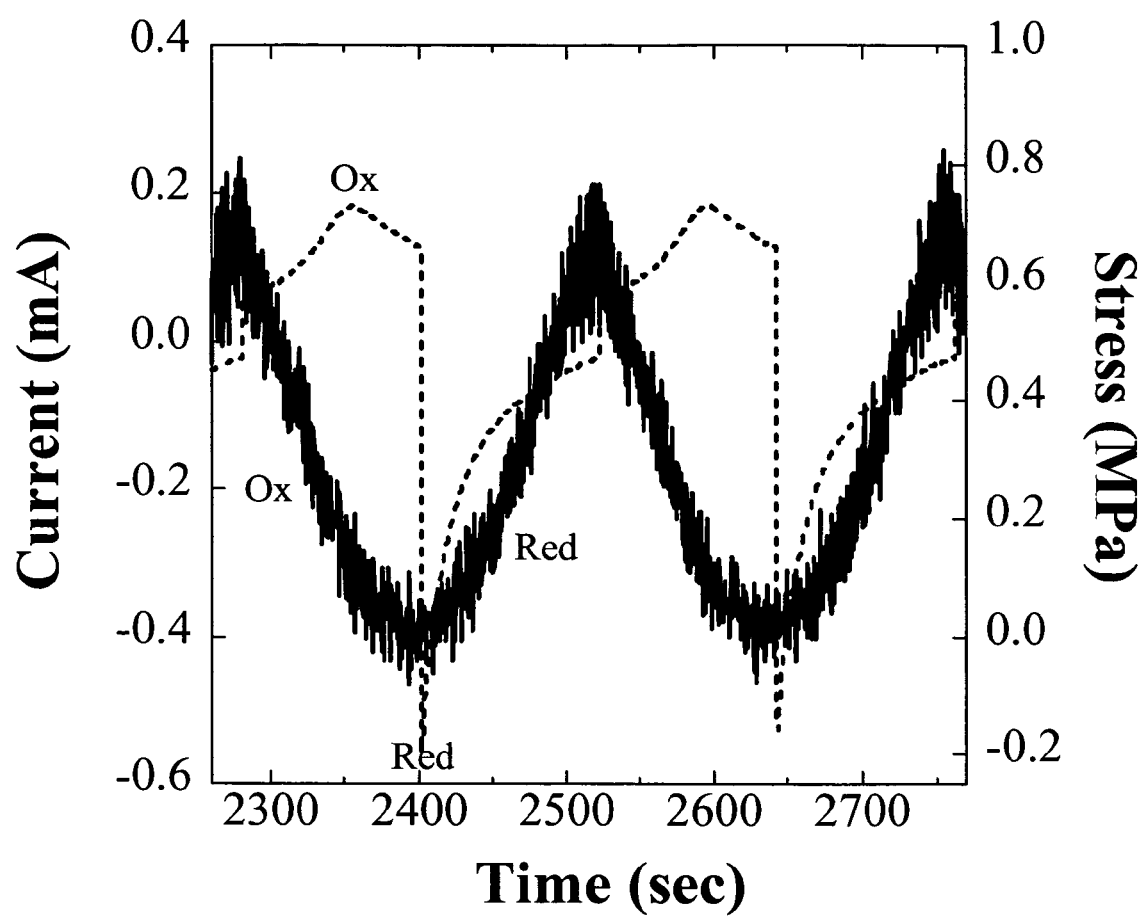
Figure 10:
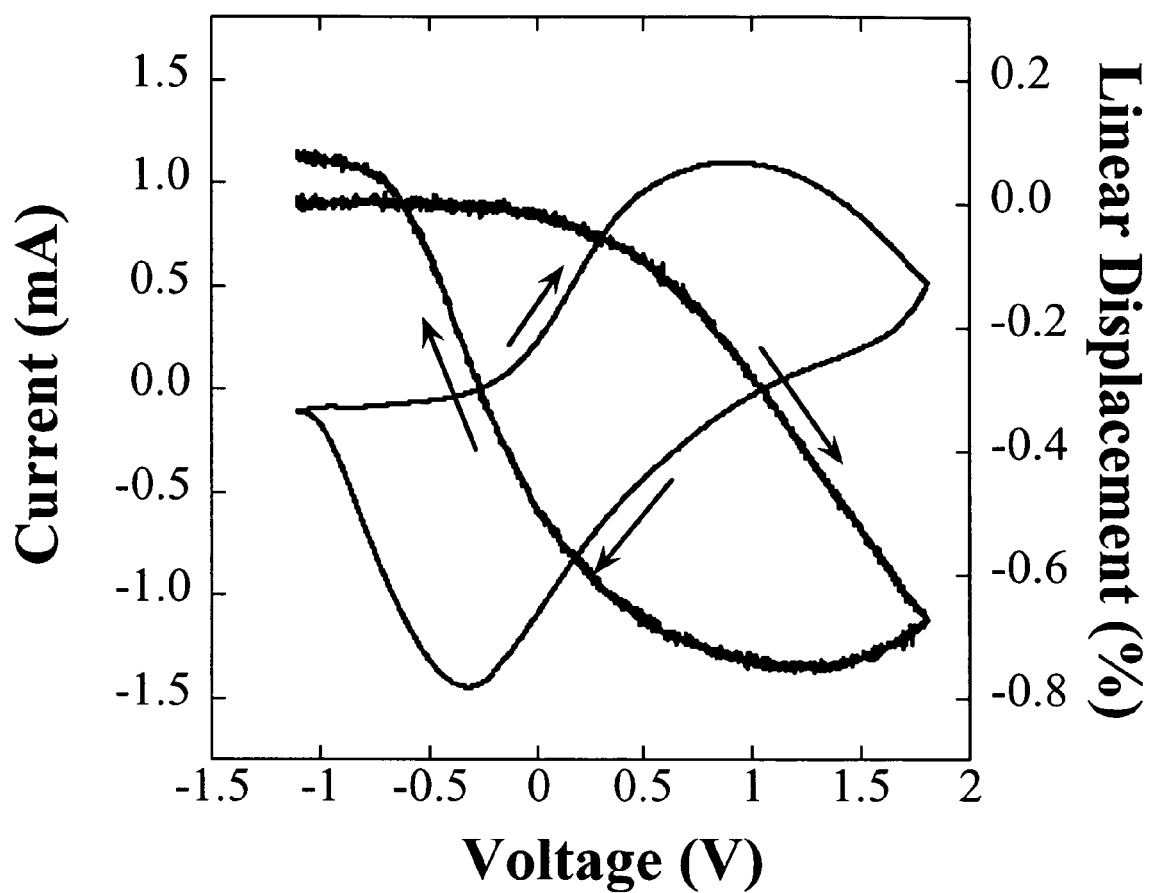
FIG. 10 shows the cyclic voltammogram for a 20 strand PANI.$CF_3SO_3$ yarn in [BMIM][$BF_4$] at a scan rate of 5 mV/s, with its corresponding length change (darker line).
Figure 11:
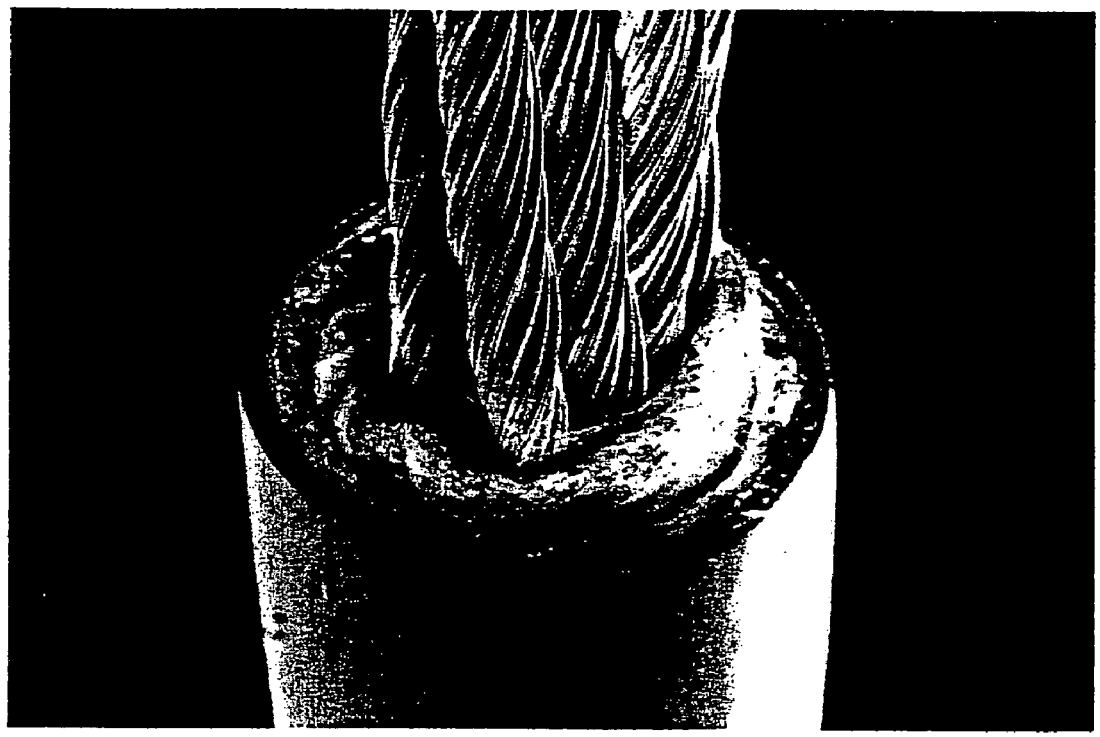
FIG. 11 is a SEM image of the construction of an all-polymer yarn-in-hollow fiber actuator, where PANI.$CF_3SO_3$ yarn is first surrounded by a porous, but electrically insulating, nanofiber mat; inserted into the lumen of an electrically conductive polyaniline hollow fiber; and the lumen filled with a room temperature ionic liquid.
Figure 12A:
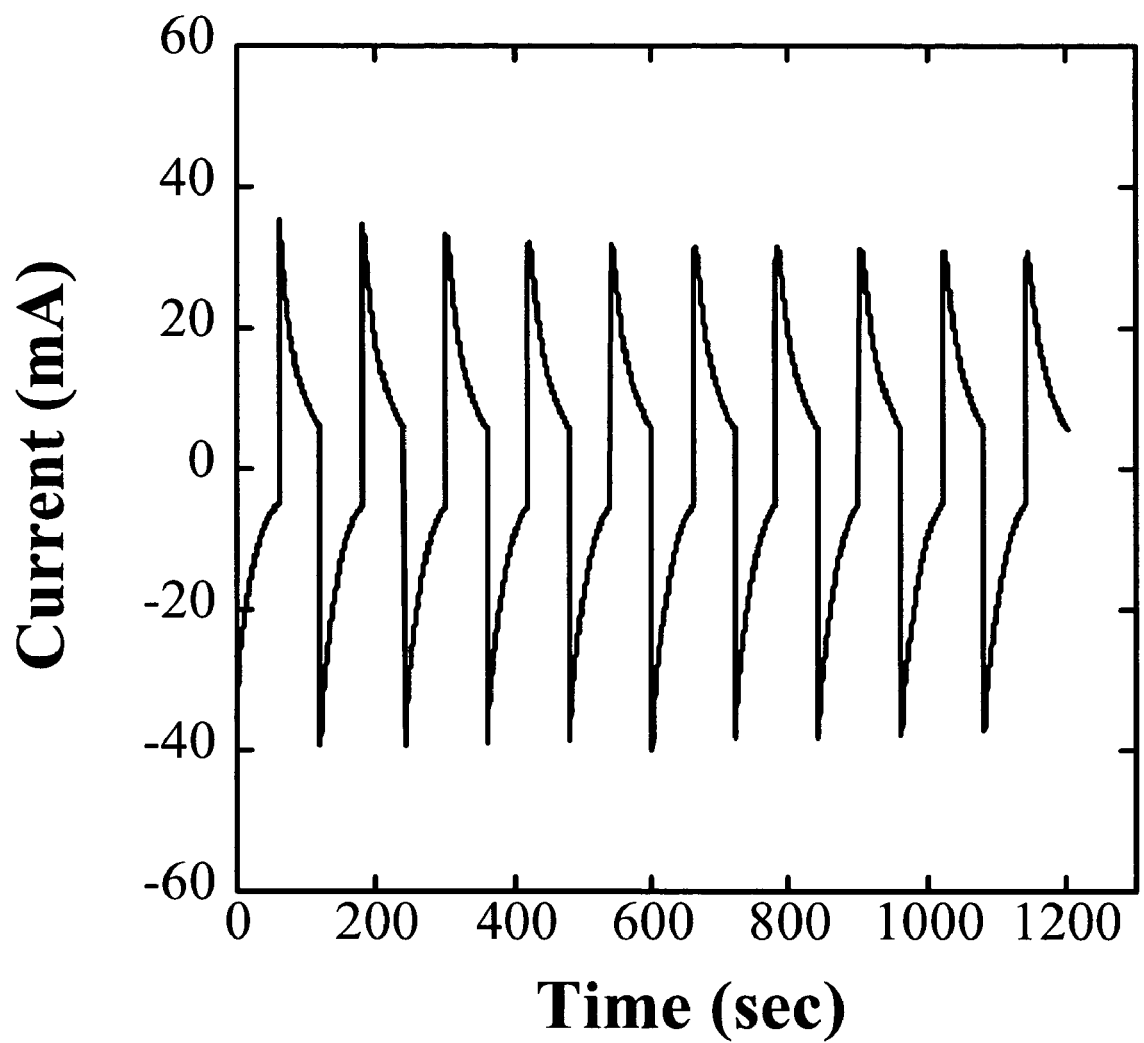
FIGS. 12a-12d show chronoamperograms of the yarn-in-hollow fiber actuator obtained shown in FIG. 11 hereof under several voltage pulsing conditions: (a): ±1.5 V (60 s), (b): ±3 V (1 s), (c): ±3 V (5 s), and (d): ±3 V (10 s).
Figure 12B:
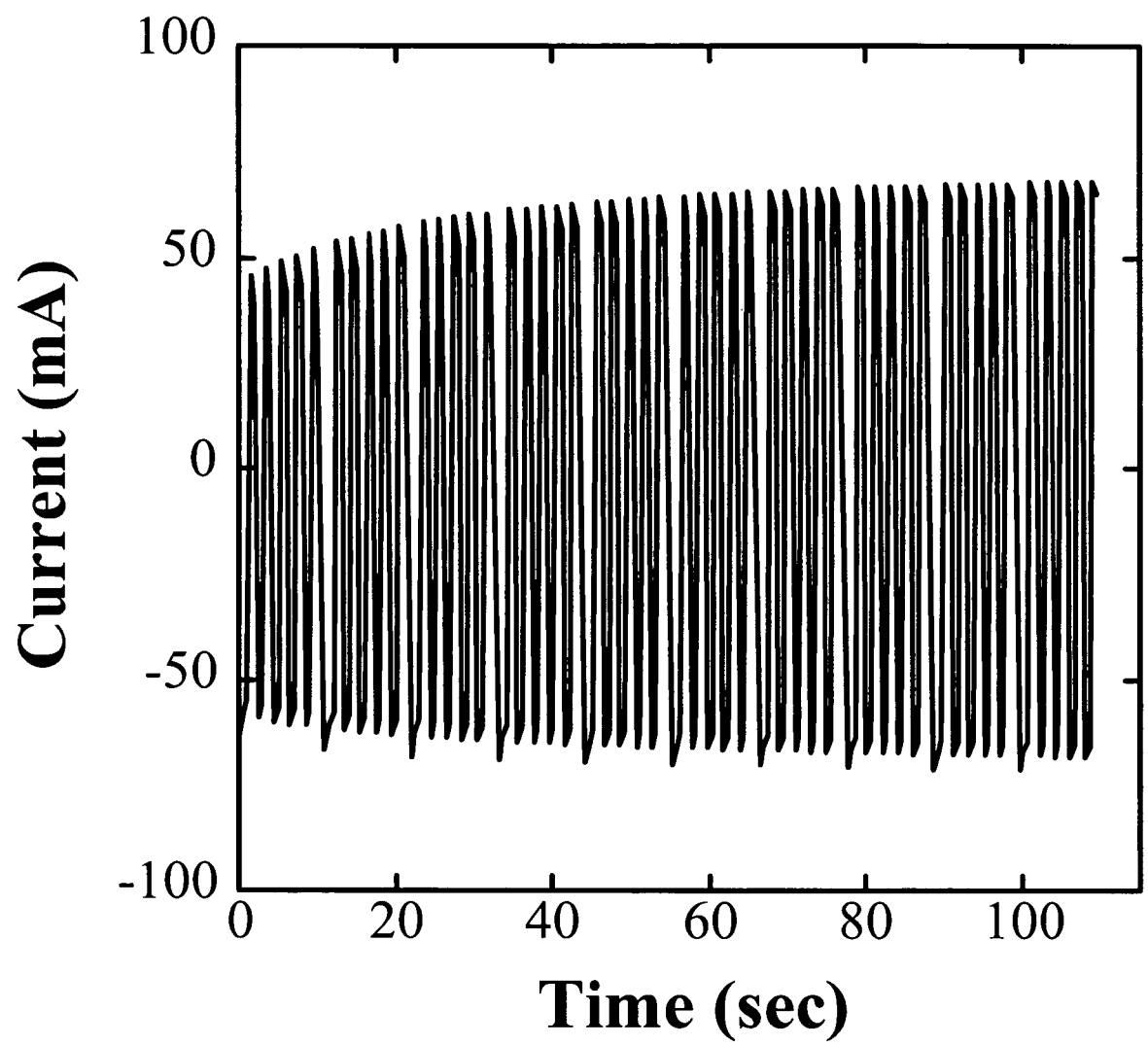
Figure 12C:
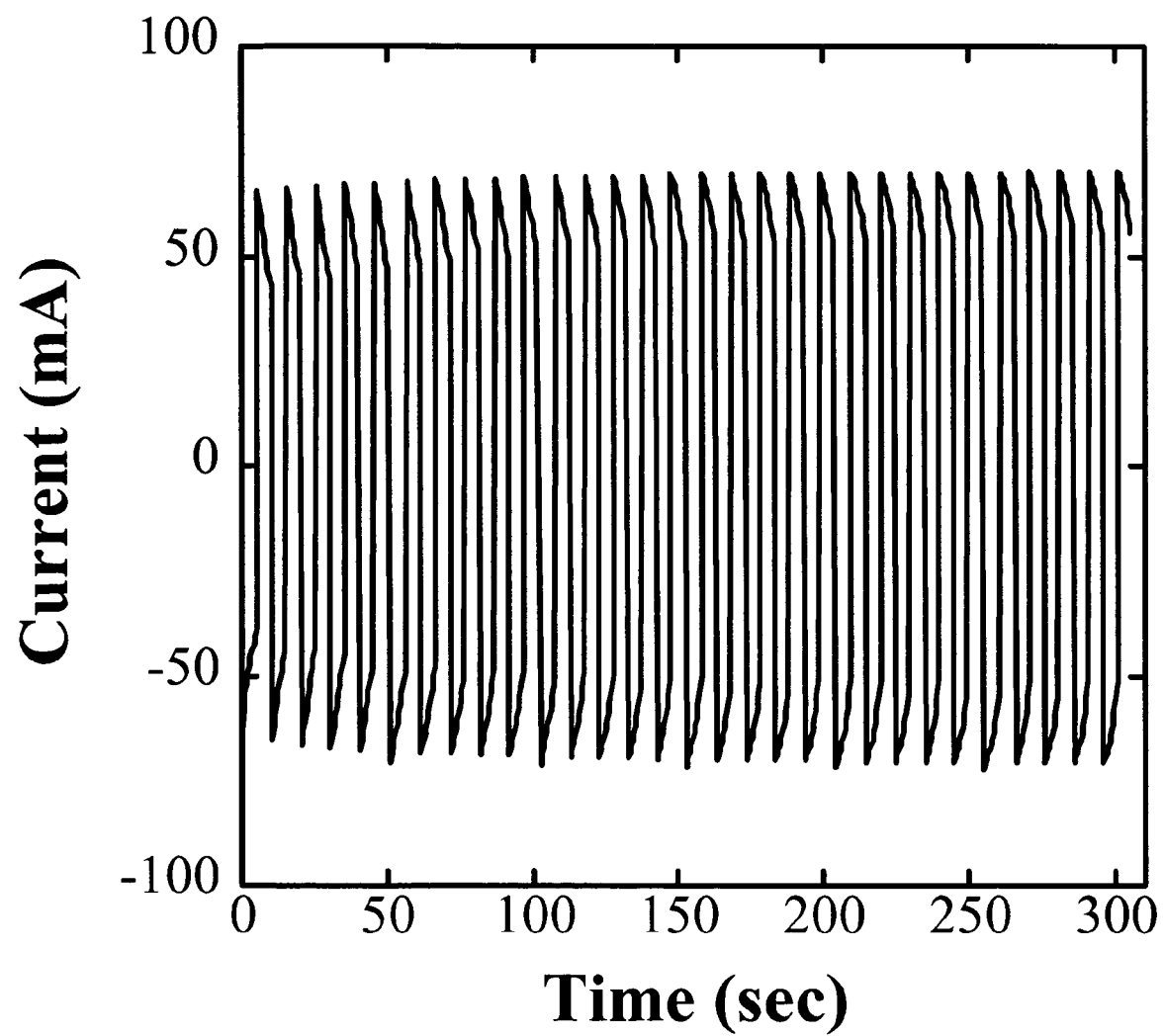
Figure 12D:
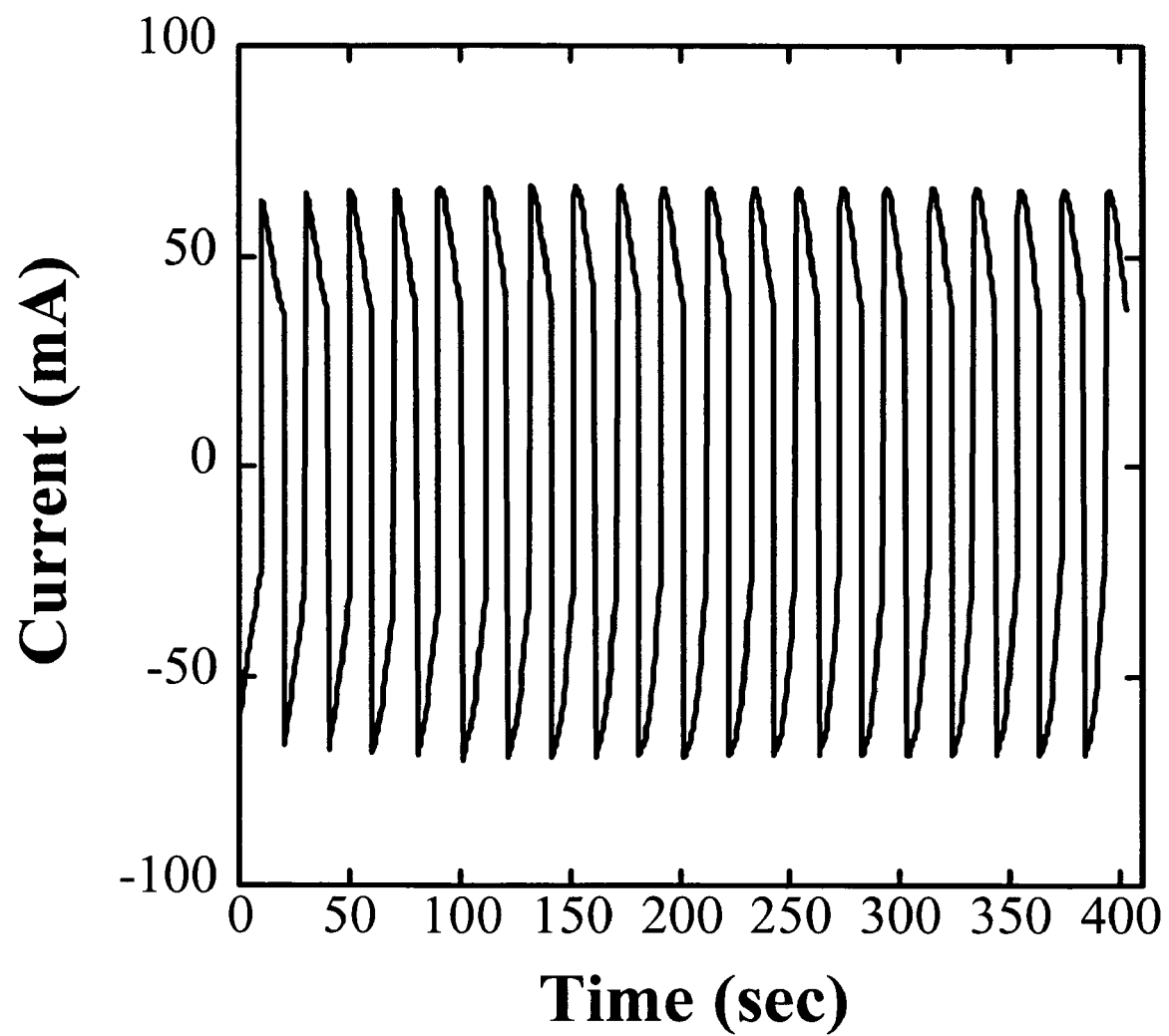

Solid PANI.CF$_3$SO$_3$ fibers showed well-defined electroactivity and actuation in LiClO$_4$/PC, as shown in FIG. 5$b$, ensuring their use as actuation electrodes in all-polymer actuators. Due to its thickness, hollow fibers did not show movement upon electrochemical stimulation. Nevertheless, these fibers did have well-defined electroactivity (FIG. 6), which enabled their use as counter electrodes in all-polymer actuators. A PMMA/PC/EC/LiClO$_4$ gel electrolyte was used, which has an ionic conductivity of $1 \times 10^{-3}$ S/cm. A scanning electron microscope (SEM) micrograph of the actuator is shown in FIG. 7. This actuator design has advantages in that the space in the hollow fiber serves as an electrolyte storage chamber for either liquid or solid electrolytes, evaporation of the electrolyte is minimized by the small area exposed to air, extending the lifetime of the device. Since the same material is used to make both solid and hollow fibers, the same redox processes take place at both electrodes. This simplifies the composition of the electrolyte, since only one salt is required; otherwise, two salts—one for the working electrode, and another for the counter electrode are needed. Current and strain with voltage cycling are shown in FIG. 8. Comparing the cyclic voltammograms of a single solid fiber in a liquid electrolyte (FIG. 5$b$) and a solid-in-hollow actuator (FIG. 8), a slower redox process is observed for the encapsulated gel actuator, as evidenced by the broader peaks and larger peak separation at the same scan rate. This indicates slower ion movement in the solid electrolyte, and possibly also slower transport of electrolyte ions between the electrolyte and the polymer. Accordingly, for a slower scan rate of 1 mV/s (FIG. 9$a$), the hysteresis in actuation was reduced from 1 V to 0.6 V and a more typical actuation profile of expansion upon oxidation and contraction upon reduction for an anion exchange conducting polymer actuator was obtained (Compare with FIG. 5$b$, hereof.).

Due to the small current passed through the actuator (FIG. 8), IR drops related to the resistance of the device (about 30Ω) should be small compared to the applied voltage. Therefore, the applied voltage is used to control the difference in potentials between solid and hollow fibers. If the hollow fiber serves as a reference electrode; that is, its potential remains approximately constant, then the potential of the solid fiber and its actuation are determined by the applied voltage. Because of its much greater volume, the oxidation level of the hollow fiber does not change significantly as a result of the charge passed in oxidizing/reducing the solid fiber; therefore, its use as a quasi-reference is justified.

The strain and stress generation of the actuator upon voltage cycling and pulsing are shown in FIG. 9, and the actuation performance is summarized in TABLE 2 which presents actuation performance of an all-polymer solid-in-hollow fiber linear actuator obtained upon electrochemical stimulation. The weight of the actuator was 0.00013 g and the force generated by the actuator upon electrochemical stimulation was around 0.6 g, indicating that the actuator can lift an object more than 4500 times heavier than its own weight. The minimum force density required for a pseudo-muscular actuator is considered to be 0.1 to 0.5 MPa, which is the force density generated by skeletal muscle; thus, the present all-polymer linear actuators satisfy this requirement.

TABLE 2

| | Stimulation Type | |
|---|---|---|
| Actuation Performance | Voltage Cycling* | Voltage Pulsing |
| Strain (%) | 0.91 | 0.85 |
| Stress (Force/Cross-Section Area) (MPa) | 0.69 | 0.93 |
| Mass Lifted/Mass of Sample (ratio) | 4,000 | 5,400 |
| Work Density (kJ/m$^3$) | 12 | 11 |
| Power Density (kW/m$^3$) | 0.11 | 0.93 |

A lifetime test was carried out with voltage pulsing as shown in FIG. 9$c$. For the first 150 cycles (10 h), stable actuation (0.85% strain) was obtained. However, continuous pulsing resulted in decreased electroactivity and actuation. After about 24 h, the gel electrolyte solidified, and the strain decreased to 0.17%, which was found to be due to the evaporation of PC from the gel electrolyte. Solvent evaporation can limit the lifetime of the solid-in-hollow fiber actuator with its open configuration. The use of ionic liquids, nonvolatile room temperature molten salts that do not evaporate, has been found to provide excellent actuator lifetime.

EXAMPLE 6

All-Polymer, Yarn-in-Hollow Fiber Actuators:

Solid PANI.CF$_3$SO$_3$ yarns with a twist ratio of 7.5 TPI showed well-defined electroactivity and actuation in the ionic liquid [BMIM][BF$_4$], as shown in FIG. 8, permitting their use as actuation elements in all-polymer actuator. Clearly, other ionic liquids can be used.

During the actuator fabrication, a between one and eight 20-monofilament polyaniline yarn was threaded through a hollow fiber (ID=1.5 mm). A porous and electrically insulating polyacrylonitrile nanofiber non-woven mat was used to separate the yarns from the hollow fiber electrode to prevent the device from short circuiting. The ionic liquid, [BMIM][BF$_4$], was then injected into the hollow space of the hollow fiber. In order to utilize the movement of the actuator to produce work, the end of a long cantilever (156 mg) was attached to one end of the yarn. The cantilever width was varied so that displacement of the actuator could be amplified. The [BMIM][BF$_4$] was used instead of the gel electrolyte because of its high conductivity (approximately 1.7 mS/cm), large electrochemical window (>2 V) over which the electrolyte is neither reduced nor oxidized, fast ion mobility during redox reactions (>$10^{-14}$ m$^2$/V·s), negligible volatility, and environmental stability.

For this actuator configuration with a single, 20-strand polyaniline yarn, using a small voltage window (between about −1 V and about +1.7 V) and a long pulse width (60 s), a large amount of charge could be injected into the polymer yarn, resulting in a large strain of 0.45%. Due to the long pulse width, the charging rate was low (2.5 mC/s), and a low strain rate (0.0075%/s) was obtained. By applying larger voltages (±3V or ±5V), but a shorter pulse width (0.5 s), a decrease in the injected charge was observed, and thus the strain of the actuator decreased. However, since a shorter pulse width was used, the charging rate was increased. This was found useful for improving the strain rate. Pulsing the actuator between ±5V with a pulse width of 0.5 s resulted in a charging rate of 20 mC/s and a strain rate of 0.05%/s. The yarn-in-hollow fiber actuator could tolerate higher voltages (up to ±5 V) than an actuator consisting of a single PANI.$CF_3SO_3$ fiber inserted into the polyaniline hollow fiber with [BMIM][$BF_4$] as the electrolyte. The single fiber actuator was destroyed upon pulsing outside this voltage window. The results for the electrochemical actuation with the different simulation protocols are summarized in TABLE 3 which presents the effects of electrochemical stimulation on actuation of a yarn-in-hollow fiber actuator.

TABLE 3

| Stimulation | Charge (mC) | Charging Rate (mC/s) | Strain (%) | Strain Rate (%/s) | Strain/ Charge Ratio (%/mC) |
|---|---|---|---|---|---|
| ±3V(0.5s) | 3.0 (0.15*) | 6.0 (0.30*) | 0.015 | 0.03 | |
| ±5V(0.5s) | 9.9 (0.49*) | 20 (0.99*) | 0.025 | 0.05 | 0.0035 |
| −1V(60s)~+1.7V(60s) | 148 (7.4*) | 2.5 (0.12*) | 0.45 | | 0.0075 |

*Data after normalization by 20 strands of fiber

Once a voltage was applied between the yarn working electrode and the hollow fiber counter electrode, the actuation generated from the yarn moved the long cantilever up and down. By pulsing the actuator between −1.5 V (60 s) and 1.5V (60 s), the intrinsic displacement of the actuator was ~0.15 mm (corresponding to a strain of ~0.4%). However, this movement was amplified 100 times by the long cantilever so that the displacement of the end of the cantilever was 15 mm. The stable current responses obtained for the device using different types of voltage stimulation are shown in FIG. 12.

Figure 13:
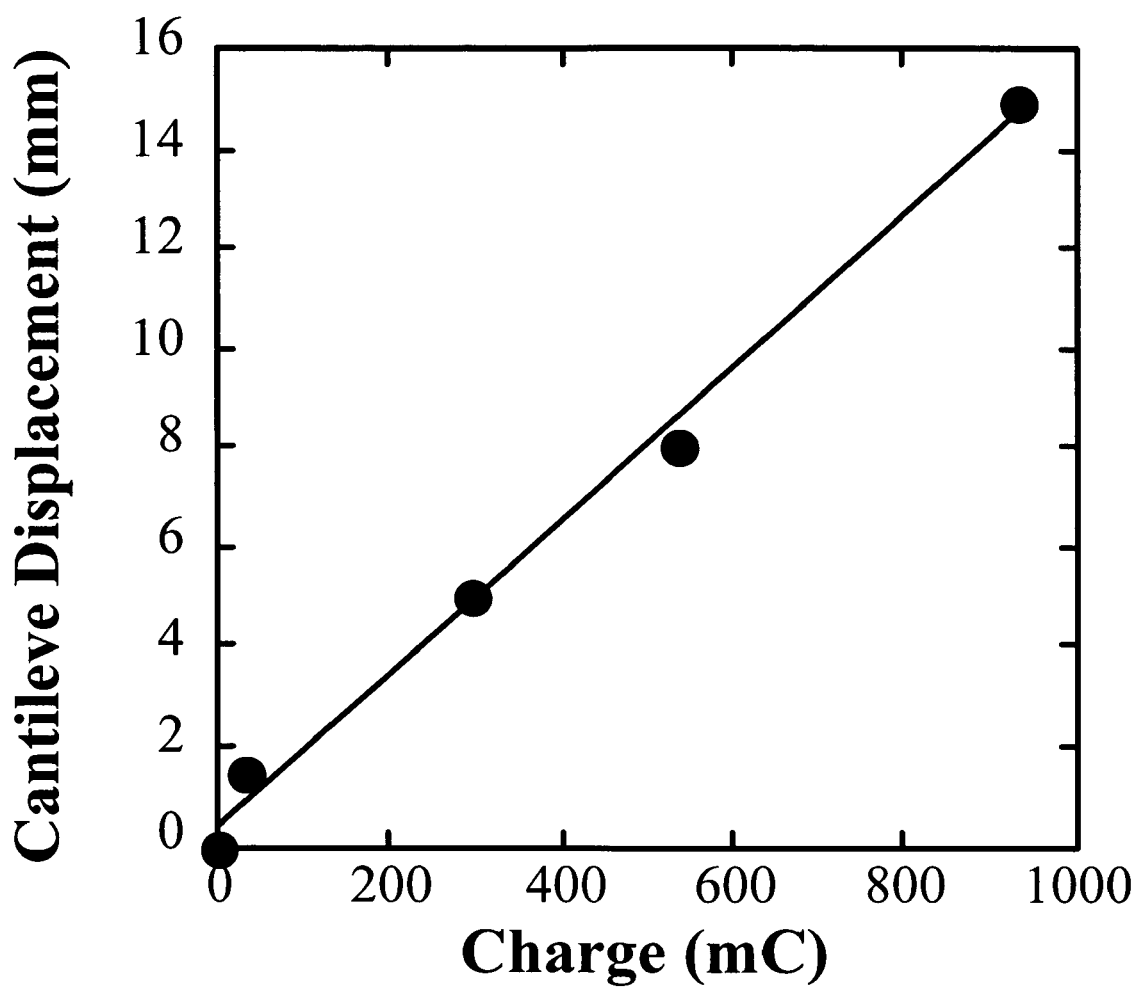
FIG. 13 is a graph showing the relationship between the charge injected into the yarn-in-hollow fiber actuator and the resulting displacement of a cantilever tip described hereinbelow.

The relationship between the charge injected into the yarn-in-hollow fiber actuator and the resulting movement of the cantilever tip is shown in FIG. 13, which shows that the injection of one coulomb of charge results in the movement of the cantilever of approximately 15 mm. This linear relationship is similar to that observed for individual actuators including a single fiber in a three-electrode system. This result supports that coupling the yarn-in-hollow fiber actuators with a cantilever can be used in practical devices. Furthermore, high voltages can be used to improve the actuation speed for this device. Pulsing the device between ±3V at 0.5 Hz (pulse width=1 s), a high actuation speed of 1.5 mm/s was obtained, which was 6 times larger than that of 0.25 mm/s obtained using the voltage range of ±1.5V at 0.008 Hz (pulse width=60 s).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for achieving linear actuation comprising in combination:
   a hollow conductive polymer fiber;
   at least one conductive polymer solid fiber having a chosen electrical conductivity and disposed within said hollow conductive polymer fiber such that said at least one conductive polymer solid fiber is electrically isolated from said conductive polymer hollow fiber, and wherein the chosen electrical conductivity of said at least one conductive polymer solid fiber is such that linear activation occurs;
   an electrolyte disposed within said hollow conductive polymer fiber; and
   a voltage source for providing a potential difference between said at least one conductive polymer solid fiber and said hollow conductive polymer fiber.

2. The apparatus as described in claim 1, wherein said at least one conductive polymer solid fiber comprises 2-acrylamido-2-methyl-1-propanesulfonic acid-doped polyaniline fiber.

3. The apparatus as described in claim 2, wherein said electrolyte comprises an aqueous electrolyte.

4. The apparatus as described in claim 3, wherein said aqueous electrolyte comprises an aqueous solution of hydrochloric acid.

5. The apparatus as described in claim 1, wherein said electrolyte comprises an ionic liquid.

6. The apparatus as described in claim 5, wherein said at least one conductive polymer solid fiber comprises 2-acrylamido-2-methyl-1-propanesulfonic acid-doped polyaniline fiber electrochemically redoped with anions soluble in said ionic liquid.

7. The apparatus as described in claim 6, wherein said ionic liquid comprises propylene carbonate in which at least one ionic salt is dissolved.

8. The apparatus as described in claim 7, wherein said at least one ionic salt comprises lithium cations.

9. The apparatus as described in claim 7, wherein said at least one ionic salt comprises anions selected from the group consisting of $CF_3COO^-$, $ClO_4^-$, $BF_4^-$, $CF_3SO_3^-$, and $N(CF_3SO_2)_2^-$.

10. The apparatus as described in claim 6, wherein said 2-acrylamido-2-methyl-1-propanesulfonic acid-doped polyaniline fiber is electrochemically redoped with $CF_3SO_3^-$ anions.

11. The apparatus as described in claim 5, wherein said ionic liquid comprises [BMIM][$BF_4$].

12. The apparatus as described in claim 1, wherein said at least one conductive polymer solid fiber is woven into at least one conducting polymer yarn.

13. The apparatus as described in claim 12, wherein said at least one yarn is disposed within said hollow conductive polymer fiber such that said at least one yarn is electrically isolated from said conductive polymer hollow fiber and from others of said at least one yarn.

14. The apparatus as described in claim 13, wherein said at least one conducting yarn is electrically insulated using a porous electrical insulator.

15. The apparatus as described in claim 14, wherein said porous electrical insulator comprises a polyacrylonitrile non-woven mat.

16. The apparatus as described in claim 1, wherein said at least one conductive polymer solid fiber has an electrical conductivity greater than about 400 S/cm.

* * * * *